United States Patent [19]
Goto et al.

[11] Patent Number: 5,909,232
[45] Date of Patent: *Jun. 1, 1999

[54] THERMAL RECORDING SYSTEM FOR PREHEATING A THERMOSENSITIVE RECORDING MEDIUM AND METHOD THEREFOR

[75] Inventors: Yasuhiko Goto; Masaru Noguchi; Kazuo Horikawa; Toshitaka Agano; Shinji Imai, all of Ashigarakami-gun; Mitsuru Sawano, Fujinomiya, all of Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/471,178

[22] Filed: Jun. 6, 1995

Related U.S. Application Data

[63] Continuation-in-part of application No. 08/023,383, Feb. 26, 1993, abandoned.

[30] Foreign Application Priority Data

Feb. 27, 1992 [JP] Japan ................................ 4-41730
Nov. 13, 1992 [JP] Japan ................................ 4-304088

[51] Int. Cl.$^6$ ................................ B41J 2/38; B41J 2/435
[52] U.S. Cl. ................................ 347/187; 347/224
[58] Field of Search ................................ 347/171, 185, 347/186, 187, 224; 503/227; 346/76.1

[56] References Cited

U.S. PATENT DOCUMENTS

| | | | |
|---|---|---|---|
| 3,693,183 | 9/1972 | Lemke | 346/74 M |
| 4,355,318 | 10/1982 | Miyauchi | 346/76 L |
| 4,704,621 | 11/1987 | Van Cooten et al. | 346/153.1 |
| 4,998,121 | 3/1991 | Koh et al. | 346/160 |
| 5,164,742 | 11/1992 | Baek et al. | 346/762 |
| 5,296,439 | 3/1994 | Maruyama et al. | 305/201 |

FOREIGN PATENT DOCUMENTS

| | | |
|---|---|---|
| 0 558 078 | 9/1993 | European Pat. Off. . |
| 50-23617 | 3/1975 | Japan . |
| 54-061543 | 5/1979 | Japan . |
| 55-057494 | 4/1980 | Japan . |
| 58-94494 | 6/1983 | Japan . |
| 59-164155 | 9/1984 | Japan ................................ 346/76 |
| 0118685 | 1/1985 | Japan . |
| 61-291183 | 12/1986 | Japan . |
| 62-77983 | 4/1987 | Japan . |
| 62-78964 | 4/1987 | Japan . |
| 0236988 | 2/1990 | Japan . |
| 03258564 | 11/1991 | Japan . |
| 524219 | 2/1993 | Japan . |
| 5301447 | 11/1993 | Japan . |

OTHER PUBLICATIONS

IBM Technical Disclosure Bulletin, vol. 1, No. 6, Apr., 1959, Armond, NY, USA, p. 4, M.P. Prater "Superthresshold Impact Heat Printing".

*Primary Examiner*—Safet Metjahic
*Assistant Examiner*—Christopher E. Mahoney
*Attorney, Agent, or Firm*—Sughrue, Mion, Zinn, Macpeak & Seas, PLLC

[57] ABSTRACT

A thermal recording system for recording an image on a thermo-sensitive recording medium using a laser beam under a preheated condition of the thermo-sensitive recording medium. In the thermal recording system, a preheating device preheats the thermo-sensitive recording medium which has leuco dyes, a developer and light-absorbing dyes all provided on a support, and which develops color in a continuous tone at a density corresponding to the energy of the applied heat, to a predetermined temperature less than a color-developing temperature. A heating-beam generating device allows a laser beam to scan the thermo-sensitive recording medium so as to heat the thermo-sensitive recording medium to a predetermined color-developing temperature. Thus, the heating-beam generating device can control the laser beam in a sufficient control range, thereby making it possible to record an image on the thermo-sensitive recording medium with high accuracy.

33 Claims, 27 Drawing Sheets

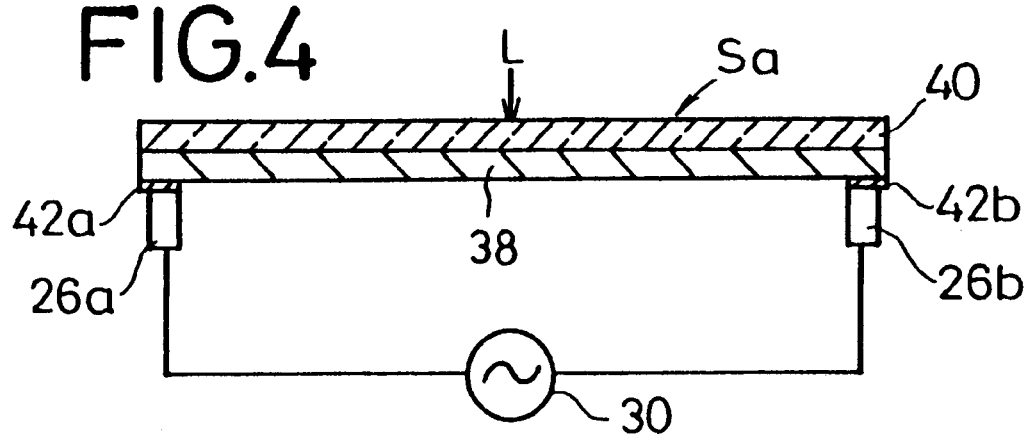
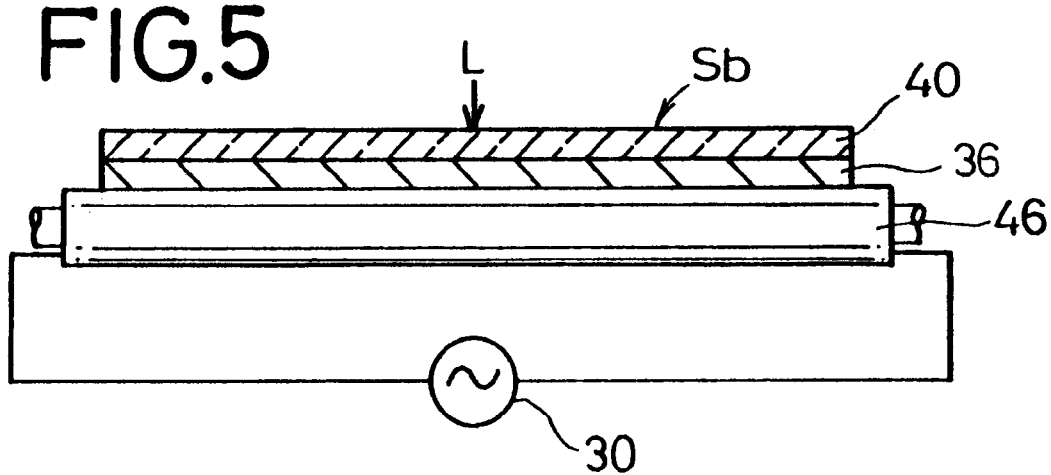

THERMAL RECORDING SYSTEM FOR PREHEATING A THERMOSENSITIVE RECORDING MEDIUM AND METHOD THEREFOR

This is a continuation-in-part of application Ser. No. 08/023,383 filed Feb. 26, 1993 now abandoned.

BACKGROUND OF THE INVENTION

1. Field of the Invention

The present invention relates to a method of and a system for thermally recording an image or the like on a thermo-sensitive recording medium using a laser beam where the thermo-sensitive recording medium has been preheated.

2. Description of the Related Art

A thermal recording system is widespread which applies heat energy to a heat- or thermo-sensitive recording medium so as to record an image or the like thereon. In particular, a thermal recording system capable of recording an image in continuous tone at a high speed by using a laser as a heat source has been proposed (see Japanese Patent Application Laid-Open Publication Nos. 50-23617, 58-94494, 62-77983 and 62-78964, as examples).

As a thermo-sensitive recording material or medium applicable to such a thermal recording system and capable of recording satisfactory images in high quality, the present applicant has developed a medium which has leuco dyes, a developer and light-absorbing dyes all provided on a support and produces or develops color at a density corresponding to the energy of applied heat (see Japanese Patent Application Nos. 3-62684 and 3-187494, for example).

This type of thermo-sensitive recording medium has a thermo-sensitive layer formed on a support by dissolving a microcapsule containing at least leuco dyes, a developer and light- absorbing dyes in an organic solvent insoluble or soluble in water and thereafter applying a coating liquid containing particles emulsified and dispersed therein on the resultant product.

The leuco dyes have the properties for donating electrons or accepting protons such as protonic acids so as to give rise to color. The leuco dyes are normally substantially colorless and have partial skeletons such as lactone, lactam, sultone, spiropyran, ester, amide, etc. Compounds held in contact with the developer so as to allow these partial skeletons to open the ring or produce cleavage are used as the leuco dyes. Specific examples of the compounds may include crystal violet lactone, benzoyl leucomethylene blue, malachite green lactone, rhodamine B lactam, 1,3,3-trimethyl-6'-ethyl-8'-butoxyindolinobenzospiropyran, etc.

The developers corresponding to these leuco dyes, include acidic substances such as phenolic compounds, organic acids or metallic salt containing the same, oxybenzoate ester, etc. The developers may preferably have a melting point range of from 50° C. to 250° C. Particularly preferred is phenol or an organic acid insoluble in water having a melting point range of from 60° C. to 200° C. Specific examples of the developers have been described in Japanese Patent Application Laid-Open Publication No. 61-291183, for example.

Preferred as the light-absorbing dyes, are those which absorb less light in the visible range and are particularly excellent in the rate of absorption of wavelengths of radiation in the infrared region. Examples of the dyes may include cyanine dyes, phthalocyanine dyes, pyrylium and thiopyrylium dyes, azulenium dyes, squarylium dyes, metal complex dyes containing Ni, Cr, etc., naphthoquinone and anthraquinone dyes, indophenol dyes, indoaniline dyes, triphenylmethane dyes, triallylmethane dyes, aminium and diimmonium dyes, nitroso compounds, etc. Of these, those in which the absorption rate of light in the near infrared region, (with a wavelength range of from 700 nm to 900 nm) is high, are particularly preferred in view of the fact that a semiconductor laser for generating near infrared light has been put to practical use.

Since, on the other hand, the thermo-sensitive recording medium referred to above is kept in a stable conserved state, it does not develop color when the heat energy is low in level. Accordingly, a substantial quantity of heat energy is required to obtain a desired color-developed state. As a result, the dynamic range becomes narrow by a threshold value corresponding to the heat energy required to produce or develop the color and hence difficulties arise in the production of a high-tonal image. Further, a load imposed on the thermal recording system for developing the color greatly increases.

The thermo-sensitive recording medium develops colors to form a visual image depending on the thermal energy applied thereto. It is known that the density of the developed image increases with time at a normal temperature after the visual image has been recorded. Therefore, there is a problem of an image density that varies from the image density at the time immediately after recording the image, depending on the time elapsed after the recording.

SUMMARY OF THE INVENTION

It is therefore an object of the present invention to provide a method of and a system for thermally recording an image or the like wherein the dynamic range of a laser beam used for recording the image can be sufficiently ensured to thereby obtain an image in high gradation and with high accuracy and any load imposed on a heating-beam generating means for generating the laser beam can be reduced, thereby making it possible to simplify the system, reduce its cost and stabilize the recorded image or the like.

To achieve the above object, there is provided a thermal recording system comprising preheating means for preheating a thermo-sensitive recording medium which has leuco dyes, a developer and light-absorbing dyes all provided on a support, which develops color at a density corresponding to a thermal energy applied thereto, with a thermal energy less than a color-developing thermal energy, and heating-beam generating means for scanning the thermo-sensitive recording medium with a laser beam so as to heat the thermo-sensitive recording medium with the predetermined color-developing thermal energy.

In the thermal recording system according to the present invention, the leuco dyes, the developer and the light-absorbing dyes are provided on the support. Further, the thermo-sensitive recording medium, which develops the color in continuous tone at the density corresponding to the applied thermal energy, is preheated with a thermal energy near but less than the color-developing thermal energy. In this condition, desired color-development can be effected by scanning the thermo-sensitive recording medium with the laser beam emitted from the heating-beam generating means.

Here, the preheat temperature is detected and controlled so as to reach a desired temperature. As a result, the heating for the color development can be efficiently and accurately effected.

Further, a desired preheat temperature can be obtained by detecting the density of a preheat-type color-developing portion of the thermo-sensitive recording medium and setting the detected density to a predetermined density under temperature control.

To achieve the above object, there is provided a method of thermally recording an image on a thermo-sensitive recording medium which develops color in continuous tone at a density corresponding to a thermal energy applied thereto comprising the steps of a first step of heating said thermo-sensitive recording medium with a predetermined color-developing thermal energy by a laser beam modified according to information to be recorded, and a second step of heating said thermo-sensitive recording medium with a thermal energy less than the predetermined color-developing thermal energy.

With the above method, the density of color developed by the thermo-sensitive recording medium can be stabilized.

To achieve the above object, there is also provided a method of thermally recording an image on a thermo-sensitive recording medium which develops color in continuous tone at a density corresponding to thermal energy applied thereto comprising the steps of, a first step of preheating said thermo-sensitive recording medium with thermal energy less than a predetermined color developing thermal energy, a second step of applying the color developing thermal energy to the preheated thermo-sensitive recording medium by a laser beam modified according to information to be recorded, and a third step of heating the thermo-sensitive recording medium to which the color developing thermal energy has been applied, with thermal energy less than the color-developing thermal energy.

With the above method, the load on the heating beam generating means is lessened by preheating the thermo-sensitive recording medium, and the density of color developed by the thermo-sensitive recording medium can be stabilized owing to the post-recording heating.

The preheating temperature and post-recording temperature are set between 40° C. and 275° C., preferably between 40° C. and 150° C., further preferably between 60° C. and 130° C. The preheating time is set to less than 30 sec. from a throughput point of view, preferably to less than 10 sec.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 4 is a view for describing another example of a thermo-sensitive recording medium and a preheating means;

FIG. 5 is a view for describing a further example of a thermo-sensitive recording medium and a preheating means;

DETAILED DESCRIPTION OF THE PREFERRED EMBODIMENTS

Thermal recording apparatuses and methods therefor according to the present invention will hereinafter be described in detail with reference to the accompanying drawings in which preferred embodiments are shown by way of illustrative example. Incidentally, in each of the following embodiments, a heating-beam generating means is controlled so as to record an image on a thermo-sensitive recording medium in continuous tone.

First Embodiment

Figure 1:
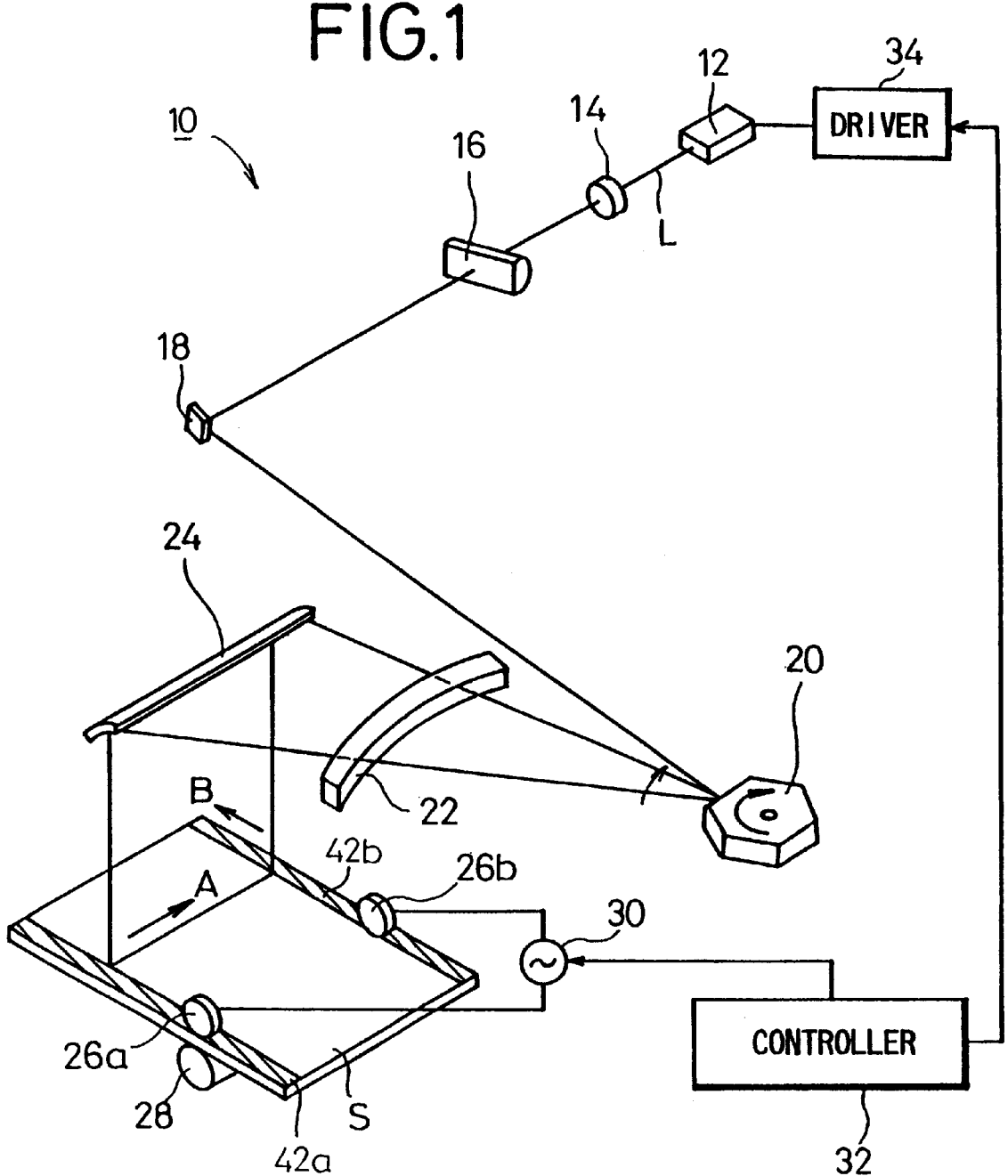
FIG. 1 is a schematic view showing the structure of a thermal recording system according to one embodiment of the present invention.

A thermal recording system 10 shown in FIG. 1 causes a heat- or thermo-sensitive recording medium S fed for auxiliary scanning in the direction indicated by the arrow B to be scanned with a laser beam L in the direction indicated by the arrow A, and records the scanned images on the thermo-sensitive recording medium S. Further, the thermal recording system 10 comprises a laser diode 12 for producing the laser beam L, a collimator lens 14 for making the laser beam L parallel as a bundle of light rays, a cylindrical lens 16, a reflection mirror 18, a polygon mirror 20 for deflecting the laser beam L, an fθ lens 22, a cylindrical mirror 24 for correcting a plane inclination or trip of the polygon mirror 20 in cooperation with the cylindrical lens 16, electrode rollers 26a, 26b brought into contact with both sides of the thermo-sensitive recording medium S, a support roller 28 disposed in opposing relationship to the electrode rollers 26a, 26b, and a power source 30 for supplying current to the electrode rollers 26a, 26b. Incidentally, the power source 30 is controlled by a controller 32 and the laser diode 12 is controlled by the controller 32 through a driver 34.

Figure 2:
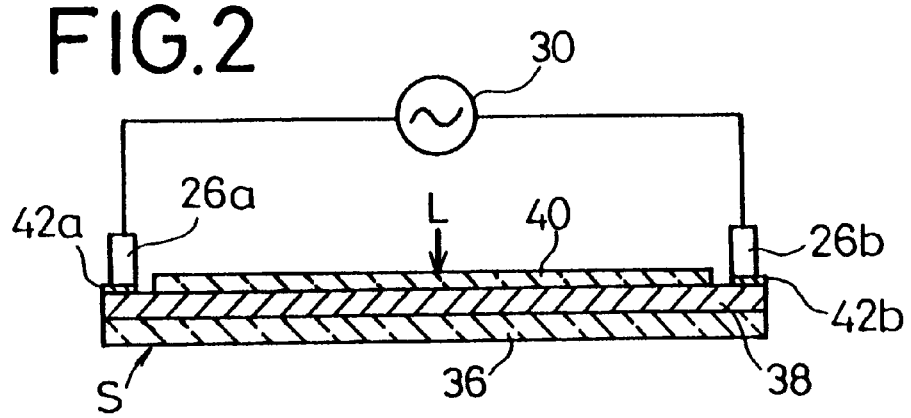
FIG. 2 is a view for describing one example of a thermo-sensitive recording medium and a preheating means both shown in FIG. 1.

As shown in FIG. 2, the thermo-sensitive recording medium S has a conductive resistance heating or heat generating layer 38 formed on a support 36 and a thermo-sensitive layer 40 fabricated on the resistance heat generating layer 38. Further, the thermo-sensitive recording medium S has electrode layers 42a, 42b formed on the resistance heat generating layer 38 and provided on both sides of the thermo-sensitive layer 40. Incidentally, a flexible and panel-shaped resistance heating or heat generating material such as an In-Sn oxide layer or a rubber heater can be used as the resistance heat generating layer 38. The thermo-sensitive layer 40 is made up of a material containing leuco dyes, a developer and light-absorbing dyes for absorbing the laser beam L and converting the absorbed laser beam L into the heat energy. Material, described in Japanese Patent Application Nos. 3-62684 and 3-187494, for example, as described above, can be used.

Incidentally, the laser diode 12 forms a heating-beam generating means, and the power source 30 and the electrode rollers 26a, 26b constitute a current supply circuit.

The thermal recording system 10 according to the present embodiment is basically constructed as described above. Operations and effects of the thermal recording system 10 will next be described.

Figure 3:
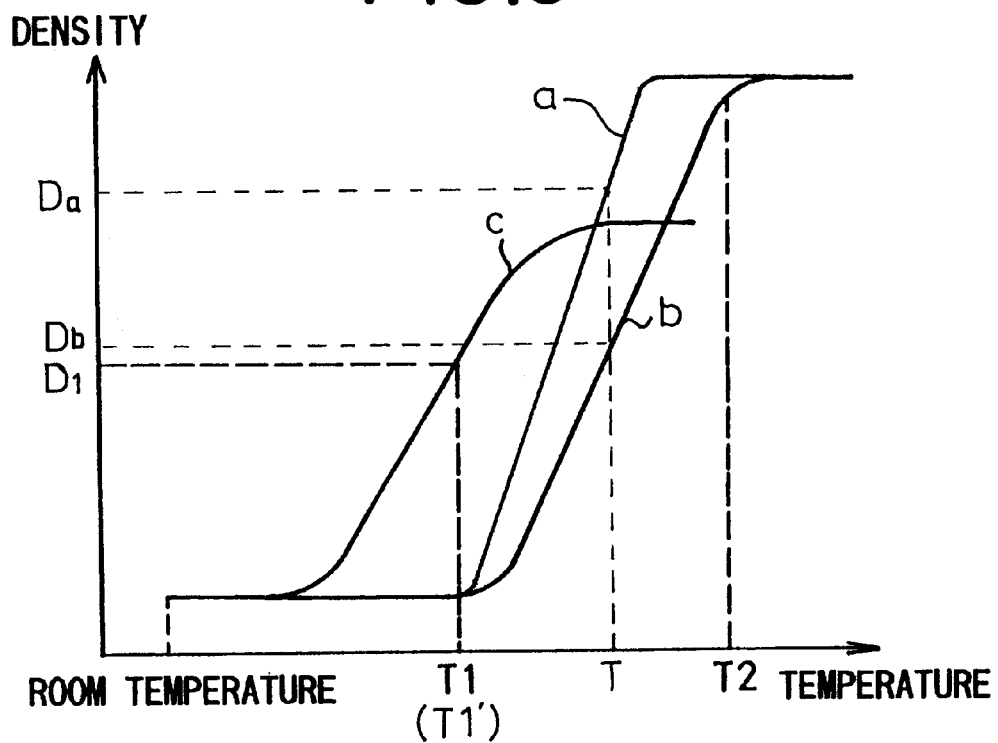
FIG. 3 is a view for describing a color development characteristic of the thermo-sensitive recording medium depicted in FIG. 2.

The controller 32 drives the power source 30 so as to preheat the thermo-sensitive recording medium S while being fed for the auxiliary scanning in the direction indicated by the arrow B with the thermo-sensitive recording medium S interposed between the support roller 28 and the electrode rollers 26a, 26b. That is, when the resistance heat generating layer 38 is brought into contact with the electrode layers 42a, 42b of the thermo-sensitive recording medium S, the current is supplied to the resistance heat generating layer 38. As a result, the thermo-sensitive recording medium S is preheated up to the temperature immediately before the color development. A characteristic curve a shown in FIG. 3 represents a relationship between the temperature and the density of the thermo-sensitive recording medium S. In the characteristic curve a referred to above, the thermo- sensitive recording medium S is preheated to a temperature of T1.

Next, the controller 32 causes the driver 34 to activate the laser diode 12. The laser diode 12 generates a laser beam L modulated according to the tone or gradation of an image recorded on the thermo-sensitive recording medium S. The laser beam L is made parallel as a bundle of light rays by the collimator lens 14 and thereafter directed to the polygon mirror 20 through the cylindrical lens 16 and by the reflection mirror 18. The polygon mirror 20 is being rotated at a high speed. Hence, the laser beam L reflected from a reflection surface of the polygon mirror 20 is introduced into the thermo-sensitive recording medium S through the fθ lens 22 and the cylindrical mirror 24. Further, the thermo-sensitive recording medium S, which is fed for the auxiliary scanning in the direction indicated by the arrow B, is scanned for main scanning along the direction indicated by the arrow A with the laser beam L. In this case, predetermined heat energy is applied to the thermo-sensitive layer 40 of the thermo-sensitive recording medium S by the laser beam L, so that a tonal image is recorded on the thermo-sensitive recording medium S.

The thermo-sensitive recording medium S has been already preheated to the temperature of T1 shown in FIG. 3 by the energy of heat generated in the resistance heat generating layer 38. It is therefore unnecessary to control the laser diode 12 in a wide temperature range from the room temperature at which the thermal recording system 10 is disposed to a temperature of T2. Accordingly, the laser diode 12 is controlled in the temperature range between the temperatures T1 and T2 and an image of high tone or gradation is formed with high accuracy. Further, the laser diode 12 is not required to produce a higher output. Therefore, the overall structure of the thermal recording system 10 is simplified and reduced in cost.

Good results can be obtained when setting the temperature T1 between 40° C. and 275° C., preferably between 40° C. and 150° C., further preferably between 60° C. and 130° C., according to the actual leuco characteristics of the thermo-sensitive recording medium S, and when the preheating period is 30 seconds or less, preferably less than 10 sec.

As shown in FIG. 4, as an alternative to the thermo-sensitive recording medium S, a thermo-sensitive recording medium Sa may be used in which a resistance heat generating layer 38 combined with the support 36 (see FIG. 2) of the thermo-sensitive recording medium S is used and the supply of current is effected from the side opposite to the surface radiated with the laser beam L. In a manner similar to the structure shown in FIG. 2, electrode layers 42a, 42b may be disposed on the thermo-sensitive layer 40 side, and the current may be supplied from the surface of the thermo-sensitive recording medium Sa, irradiated with the laser beam L. Needless to say, the current may be supplied from both surfaces.

Second Embodiment

FIG. 5 shows a structure of another embodiment of a type wherein a heat roller 46 heated with the current supplied from a power source 30, is held against the surface opposite to the surface irradiated with a laser beam L, of a thermo-sensitive recording medium Sb which does not include each of the resistance heat generating layers 38 of the thermo-sensitive recording mediums S, Sa shown in FIGS. 2 and 4, thereby preheating the thermo-sensitive recording medium Sb. In this case, the thermo-sensitive recording medium Sb is not required to provide the resistance heat generating layer 38. Further, the electrode layers 42a, 42b are made unnecessary, thereby simplifying the overall structure of the thermo-sensitive recording medium Sb.

Figure 6:
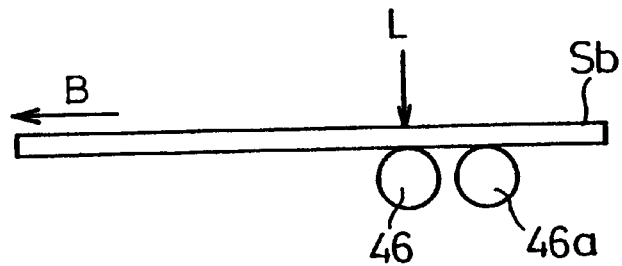
FIGS. 6A, 6B and 6C are views for describing still further examples of preheating means respectively.
Figure 6:
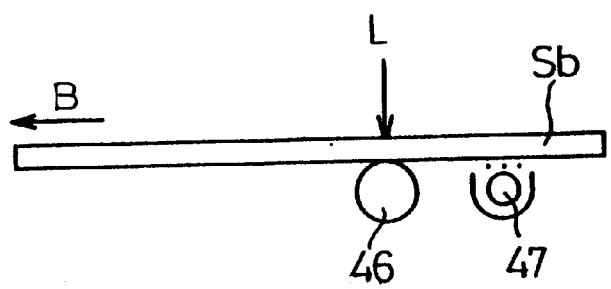
Figure 6:
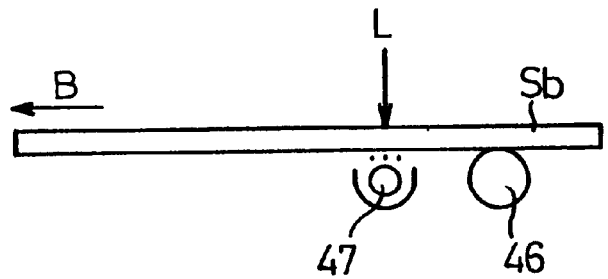

If a thermo-sensitive recording medium Sb is constructed so as to be preheated by a plurality of heat rollers 46, 46a as shown in FIG. 6A, then a preheat temperature of the thermo-sensitive recording medium Sb can be set up more stably and with high accuracy. That is, when the thermal capacity of the heat roller 46 is low under the structure shown in FIG. 5, the heat is absorbed by the thermo-sensitive recording medium Sb. As a result, the preheat temperature tends to vary. Thus, as shown in FIG. 6A, the thermo-sensitive recording medium Sb is preheated by the heat rollers 46a and thereafter set to a predetermined preheat temperature by the heat rollers 46. As a result, the preheat temperature can be maintained at the exact temperature. Similarly, the same effect as that obtained from the structure shown in FIG. 6A can be obtained even when a preheating light source 47 is provided at the stage prior to heat rollers 46 and a thermo-sensitive recording medium Sb is preheated before the preheating of the heat rollers 46 as shown in FIG. 6B. Further, if radiation heating is effected by a preheating light source 47 after a thermo-sensitive recording medium Sb has been preheated by a heat roller 46 as shown in FIG. 6C, then the thermo-sensitive recording medium Sb can be efficiently heated up to a color-developing start temperature by the heat roller 46 provided at the stage prior to the preheating light source 47 and a load imposed on the post-stage preheating light source 47 can be reduced. As a result, the preheating can be effected with higher accuracy. Obviously, variations of the above may be advantageously employed, involving a plurality of heat generating means in contact with medium Sb and of heat generating means not in contact with medium Sb.

Third Embodiment

Figure 7:
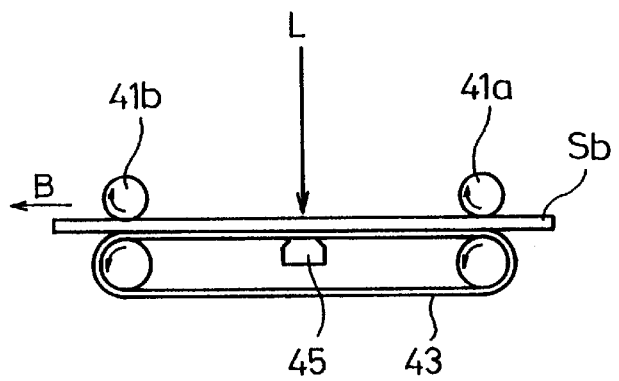
FIG. 7 is a view for describing a still further example of a preheating means.

FIG. 7 shows a structure of a further embodiment of a type wherein a thermo-sensitive recording medium Sb is held and fed by pairs of nip rollers 41a, 41b on which a thin-wall belt 43 having low thermal conductivity is wound and the thermo-sensitive recording medium Sb is then preheated by a heater 45 using the thin-wall belt 43. Since, in this case, only a necessary portion of the thermo-sensitive recording medium Sb is preheated by the thin-wall belt 43 having the low thermal conductivity, the preheat temperature can be easily and accurately controlled. Further, since the heater 45 is surrounded by the thin-wall belt 43, it is possible to cause convective air generated by preheating to escape from the sides of the thermo-sensitive recording medium Sb. Moreover, the thermo-sensitive recording medium Sb is not liable to cause flaws or the like because it does not make direct contact with the heater 45.

Fourth Embodiment

Figure 8:
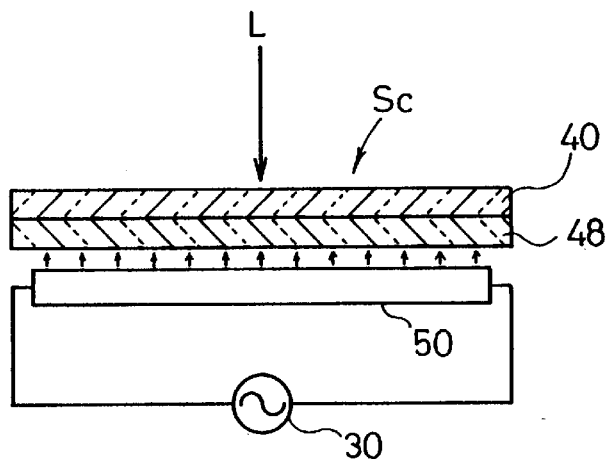
FIG. 8 is a view for describing a still further example of a thermo-sensitive recording medium and a preheating means.

FIG. 8 shows a structure of a still further embodiment of a type wherein an infrared heater 50 supplied with the current from a power source 30 is disposed closely to the side opposite to the surface irradiated with a laser beam L, of a thermo-sensitive recording medium Sc having, as a support, an endothermic or heat absorption layer 48 containing infrared absorbing dyes, for example, instead of the resistance heat generating layer 38 of each of the thermo-sensitive recording mediums S, Sa as shown in FIGS. 2 and 4. Infrared radiation emitted from the infrared heater 50 is absorbed by the heat absorption layer 48, thereby preheating the thermo-sensitive recording medium Sc. Since the infrared heater 50 is not brought into contact with the thermo-sensitive recording medium Sc in this case, the thermo-sensitive recording medium Sc can be smoothly conveyed.

Figure 9:
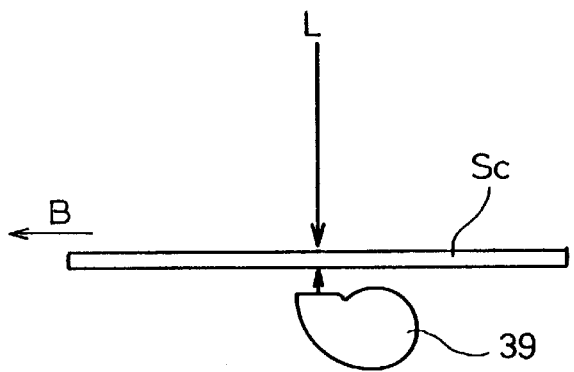
FIG. 9 is a view for describing a still further example of a preheating means.

Incidentally, a warm air heater 39 may also be used as an alternative to the infrared heater 50 as shown in FIG. 9 to feed warm air to a thermo-sensitive recording medium Sc and preheat the same. In this case, the thermo-sensitive recording medium Sc can be preheated from both sides thereof by the warm air heater 39.

Figure 10A:
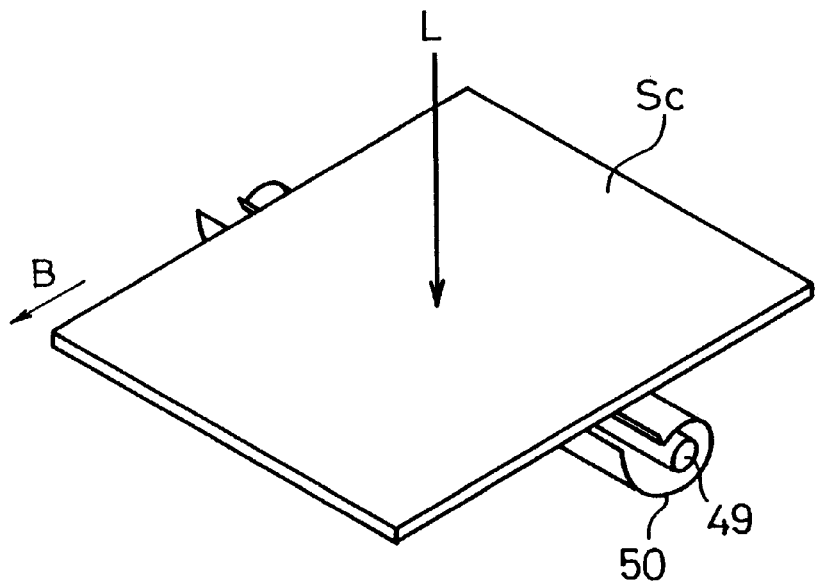
FIGS. 10A and 10B are views for describing still further examples of preheating means respectively.
Figure 10B:
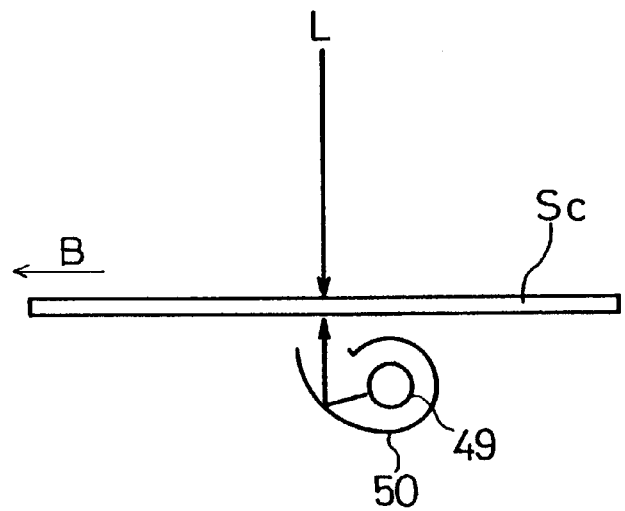

Further, the thermo-sensitive recording medium Sc may also be preheated by each of infrared heaters 49 shown in FIGS. 10A and 10B. If a reflector 50 for surrounding each of the infrared heaters 49 is elongated as compared with the width of the thermo-sensitive recording medium Sc, which extends in the direction orthogonal to its conveying direction (i.e., in the direction indicated by the arrow), then air heated by the preheating can be discharged to the outside from both ends of the reflector 50. Therefore, undesired portions are no longer preheated by the circulation of the air by convection, and the ununiformity in heating, which is caused by the circulation of the air by convection, can be avoided. It is thus possible to effect preheat control with high accuracy.

Fifth Embodiment

Figure 11:
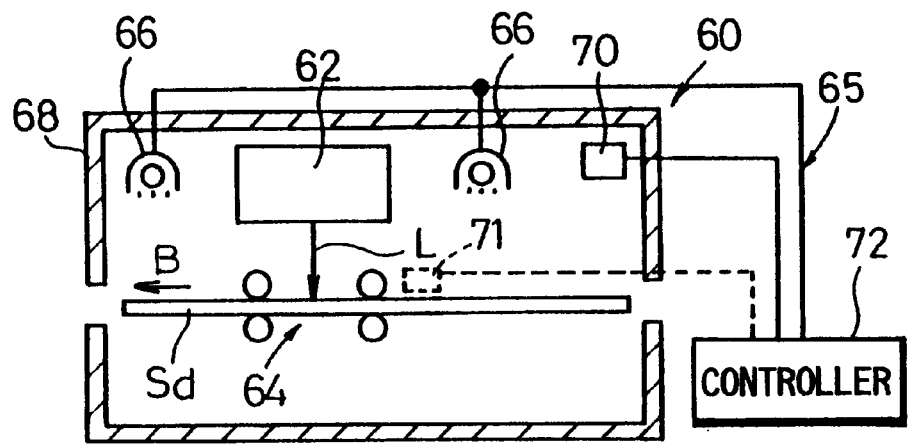
FIG. 11 is a schematic view illustrating the structure of a thermal recording system according to another embodiment of the present invention.

FIG. 11 shows a thermal recording system 60 according to a still further embodiment. The thermal recording system 60 is so constructed that a scan optical system 62 having the components of the laser diode 12 (corresponding to the cylindrical mirror 24 shown in FIG. 1), and a recording unit 64 for irradiating a thermo-sensitive recording medium Sd with a laser beam L emitted from the scan optical system 62, are accommodated in a thermal-insulated casing 68 and cut off from the outside. Further, the thermal recording system 60 has a temperature controlling means 65 for controlling the temperature in the thermal-insulated casing 62 so that the thermo-sensitive recording medium Sd is held at a preheat temperature. The temperature controlling means 65 comprises a heating means 66 such as a lamp, a temperature sensor 70 and a controller 72. Further, the thermo-sensitive recording medium Sd is composed of a recording medium layer formed on a support. The temperature in the thermal-insulated casing 68 is detected by the temperature sensor 70. The controller 72 controls the heating means 66 in response to the detected temperature in such a manner that the thermo-sensitive recording medium Sd is held at a predetermined preheat temperature. In this case, the heating means 66 can maintain the thermo-sensitive recording medium Sd at a stable preheat temperature, thereby making it possible to obtain an image which is higher in accuracy. Unless the control of an image recording operation based on the laser beam L is effected when the temperature detected by the temperature sensor 70 exceeds the predetermined preheat temperature, an image can be previously prevented from being recorded improperly.

If a thermo-sensitive recording medium temperature sensor 71 is disposed in the vicinity of the recording unit 64 and on the upstream side thereof so as to directly sense or detect the temperature of the thermo-sensitive recording medium Sd as shown in FIG. 11, then the preheat temperature of the heating means 66, (which has been controlled based on the temperature in the thermal-insulated casing 68, which has been detected by the temperature sensor 70), can be controlled with higher accuracy in accordance with the temperature of the thermo-sensitive recording medium Sd, which has been detected by the thermo-sensitive recording medium temperature sensor 71. Further, the history of the medium temperature detected by the thermo-sensitive recording medium temperature sensor 71 can be recorded. It is also possible to improve the accuracy of a predicted value of the preheat temperature of the thermo-sensitive recording medium Sd with respect to the temperature in the thermal-insulated casing 68 based on data indicative of the history. As a result, the accuracy of the recorded image can be further improved. Incidentally, the temperature control may be effected by the thermo-sensitive recording medium temperature sensor 71 alone without providing the temperature sensor 70.

Sixth Embodiment

Figure 12:
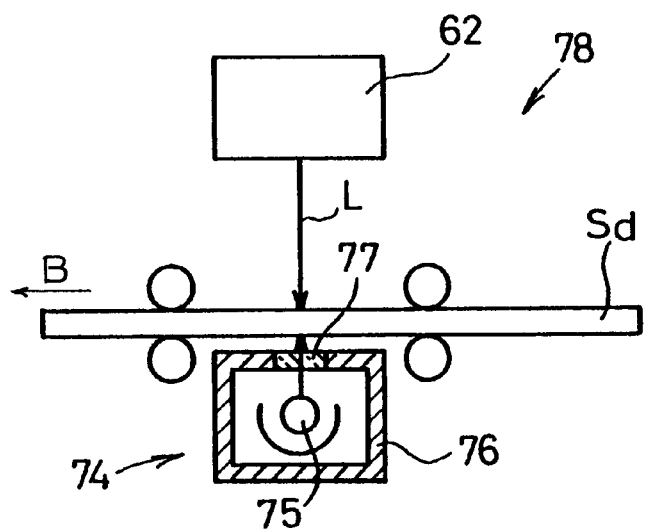
FIG. 12 is a schematic view depicting the structure of a thermal recording system according to a further embodiment of the present invention.

FIG. 12 shows a thermal recording system 78 constructed in such a manner that a thermo-sensitive recording medium Sd is preheated by using a preheating unit 74 shaped in the form of a closed type structure comprising a thermal-insulated casing 76 for an infrared heater 75, and a filter 77 which is fitted in an opening or aperture defined in the casing 76 in confronting relationship to a recording portion on the thermo-sensitive recording medium Sd. In this case, only a necessary portion of the thermo-sensitive recording medium Sd is preheated by the infrared radiation emitted from the infrared heater 75 through the filter 77. Therefore, the thermal recording system 78 does not produce an excess increase in temperature. Further, since the preheating unit 74 is of the closed type structure, the circulation of air in the thermal recording system 78 by convection is limited due to the heat of the infrared radiation. Accordingly, the recording portion can be locally preheated with high accuracy. If the aperture defined in the thermal-insulated casing 76 is sufficiently small, then the filter 77 is unnecessary.

Seventh Embodiment

Figure 13:
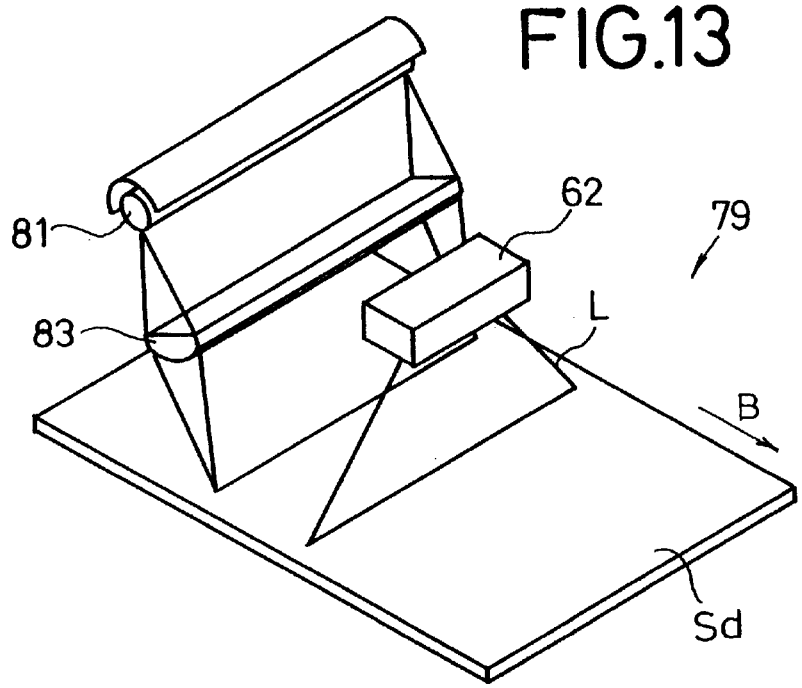
FIG. 13 is a view for describing a still further example of a preheating means.

FIG. 13 illustrates a thermal recording system 79 of a type wherein a thermo-sensitive recording medium Sd is preheated by using a near infrared lamp 81 which is elongated in a main scanning direction of the thermo-sensitive recording medium Sd and outputs near infrared radiation therefrom. In the thermal recording system 79, a cylindrical lens 83 lengthened in the main scanning direction is disposed between the near infrared lamp 81 and the thermo-sensitive recording medium Sd. If, in this case, dyes for absorbing near infrared radiation of a predetermined wavelength, which passes through the cylindrical lens 83, are contained in a recording medium layer of the thermo-sensitive recording medium Sd, then the thermo-sensitive recording medium Sd can be effectively preheated. That is, since the near infrared radiation can be focused on the thermo-sensitive recording medium Sd using the cylindrical lens 83, the thermo-sensitive recording medium Sd can be efficiently preheated in a short period of time. Further, since a preheating range can be limited to necessary portions alone by using the cylindrical lens 83 or selecting the wavelength of the near infrared radiation which passes through the cylindrical length 83 and the near infrared radiation absorbing dyes, the preheating can be more accurately effected. In the present embodiment, the thermo-sensitive recording medium Sd is preheated from the same direction as that in which a recording laser beam L travels. However, the preheating can be effected even from either direction.

Figure 14:
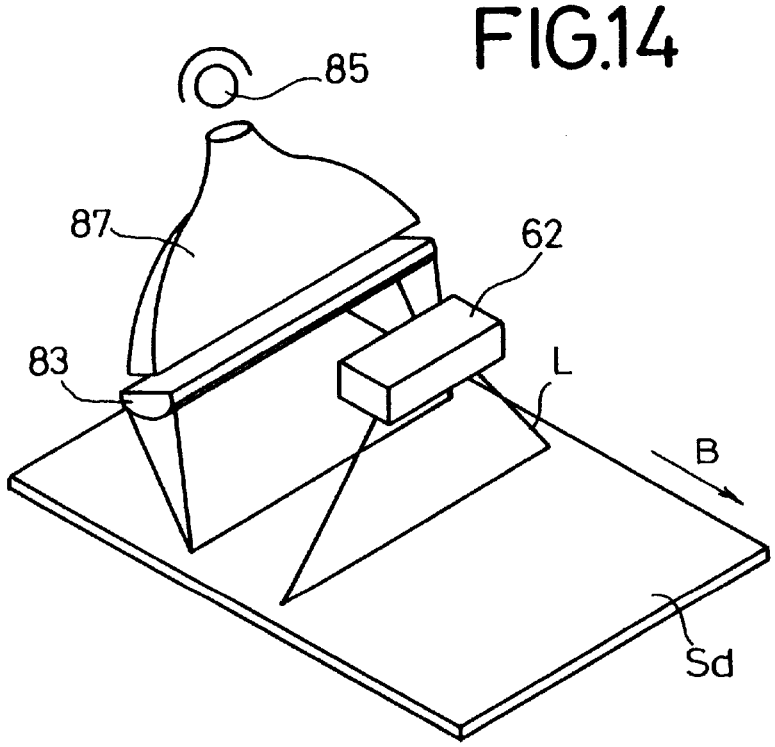
FIG. 14 is a view for describing a still further example of a preheating means.

Now, the preheating can be effected by using a near infrared lamp 85 which serves as a point or spot light source and disposing a light introducing member 87, which has one end concentrated closely to the near infrared lamp 85 and the other end extending along the longitudinal direction of a cylindrical lens 83, between the near infrared lamp 85 and the cylindrical lens 83 as shown in FIG. 14. In this case, the light introducing member 87 receives near infrared radiation emitted from the near infrared lamp 85 as a linear light source and introduces the same into a thermo-sensitive recording medium Sd through the cylindrical lens 83. Therefore, the nonuniformity in preheating, which is caused by a variation in a light-emitting characteristic of a light source, can be avoided as in the case where the linear light source is used, for example.

Eighth Embodiment

Figure 15:
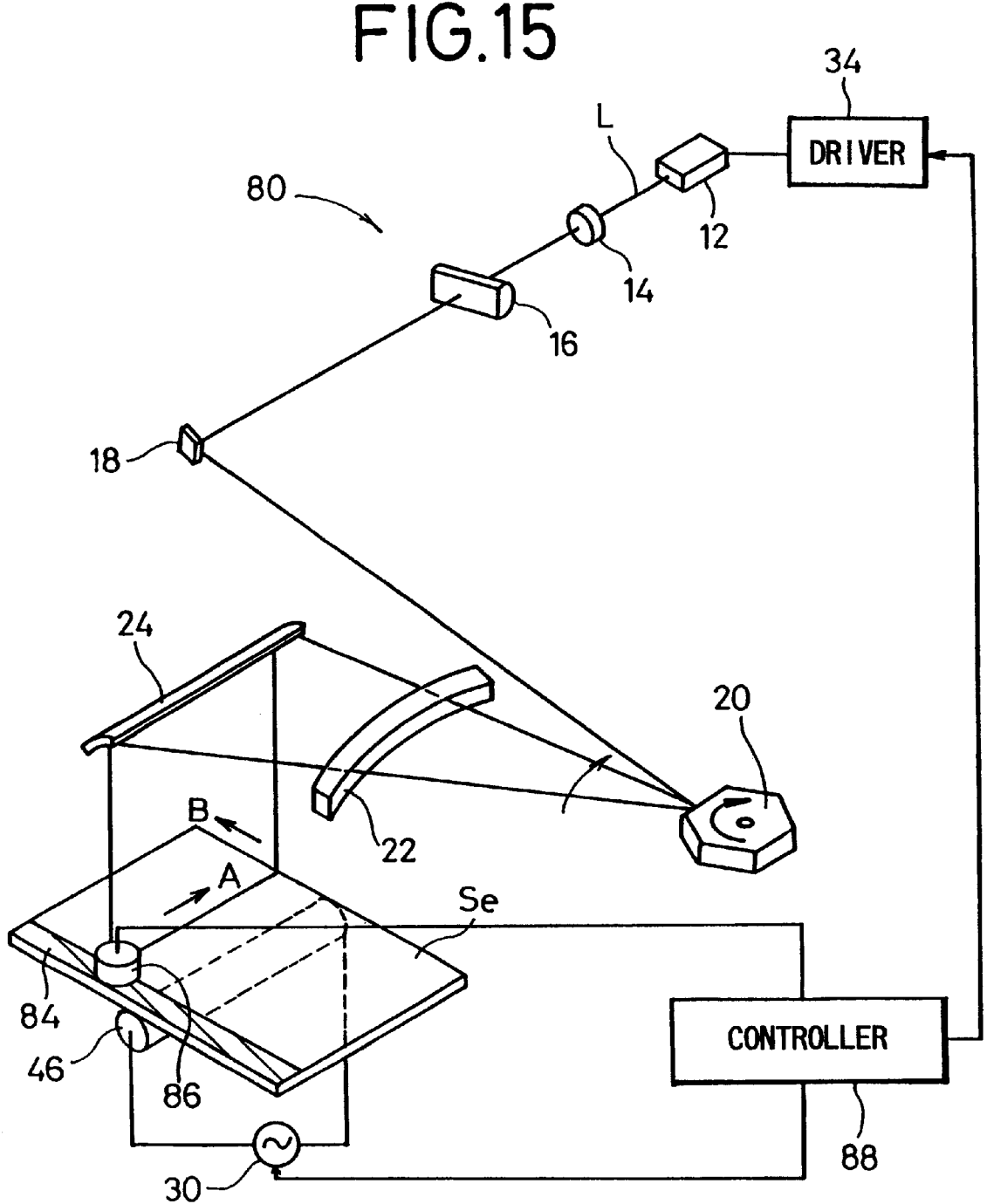
FIG. 15 is a schematic view showing the structure of a thermal recording system according to a still further embodiment of the present invention.

FIG. 15 shows a thermal recording system 80 according to a still further embodiment. In this case, the same elements of structure as those employed in the thermal recording system 10 shown in FIG. 1 are identified by like reference numerals and their description will therefore be omitted.

Figure 16:
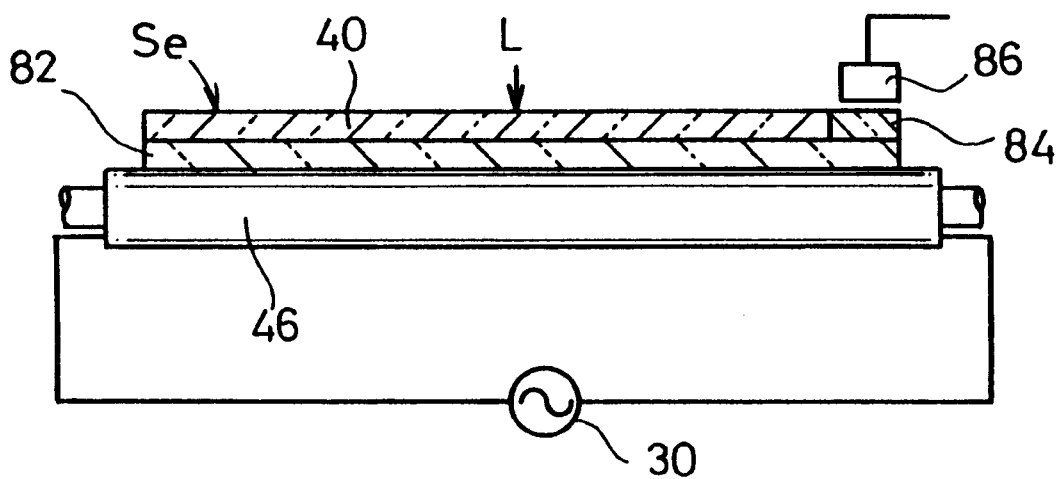
FIG. 16 is a view for describing a thermo-sensitive recording medium and a preheating means both shown in FIG. 15.

As shown in FIG. 16, a thermo-sensitive recording medium Se employed in the thermal recording system 80 is so constructed that a thermo-sensitive layer 40 is formed on a support 82. Further, a preheat-type color- developing portion 84 having a color development characteristic for producing or developing color at a temperature (as represented by a characteristic curve b shown in FIG. 3), lower than the temperature of the thermo-sensitive layer 40 (as represented by the characteristic curve a), is formed on one side of the thermo-sensitive recording medium Se. On the other hand, the thermal recording system 80 comprises a heat roller 46 which serves as a preheating unit held in rolling contact with the thermo-sensitive recording medium Se, a densitometer 86 provided close to the preheat-type color-developing portion 84 of the thermo-sensitive recording medium Se, and a controller 88 for controlling a driver 34 and controlling a power source 30 based on the density of the preheat-type color-developing portion 84, which has been detected by the densitometer 86.

In the thermal recording system 80 constructed as described above, the power source 30 supplies current to the heat roller 46 under the control of the controller 88 so as to heat the heat roller 46. As a result, the thermo-sensitive recording medium Se is preheated by the heat roller 46. At this time, the density of the thermo-sensitive layer 40 of the thermo-sensitive recording medium Se does not vary, whereas the density of the preheat-type color-developing portion 84 varies. Therefore, the densitometer 86 detects the density of the preheat-type color-developing portion 84 and supplies data indicative of its density to the controller 88. Then, the controller 88 controls the power source 30 so that the density data is brought to a density D at the temperature of T1, with the result that the thermo-sensitive recording medium Se is preheated at the temperature of T1. Since, at this time, the temperature of the thermo-sensitive recording medium Se is directly detected, the preheat temperature can be controlled with high accuracy. If the preheat temperature is adjusted and the output of the laser beam L is controlled based on the preheat temperature, then an image more excellent in quality can be obtained.

Figure 17:
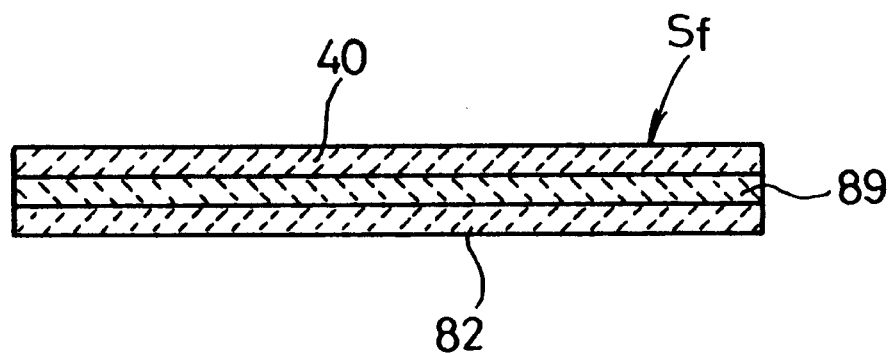
FIG. 17 is a view for describing the structure of another example of a thermo-sensitive recording medium.

Now, a thermo-sensitive recording medium Sf shown in FIG. 17 may be used as an alternative to the thermo-sensitive recording medium Se. More specifically, the thermo-sensitive recording medium Sf is constructed in such a manner that a preheat-type color-developing layer 89 composed of a thermochromic material which gives rise to color at the density corresponding to the temperature and returns to the original density upon the reduction in temperature, is formed on a support 82, and a thermo-sensitive layer 40, which exhibits a light-transmissive characteristic upon the non-development of the color, is fabricated on the preheat-type color-developing layer 89. Further, the preheat temperature can be controlled by measuring, using the densitometer 86, the density of the preheat-type color-developing layer 89 which has been subjected to a preheating process. Since, in this case, the density of the preheat-type color-developing layer 89 is returned to the original density with a decrease in temperature after the recording of the image has been completed, the density of the preheat-type color-developing layer 89 has no influence on the image density of the thermo-sensitive layer 40. Thus, when such a thermo-sensitive recording medium Sf is used, an image recording region is not restricted by the preheat-type color-developing layer 89 and the degree of freedom of location of the densitometer 86 is also improved. If the support 82 is composed of a light-transmissive material, for example, then the densitometer 86 can also be disposed on the support 82 side.

Ninth Embodiment

Figure 18:
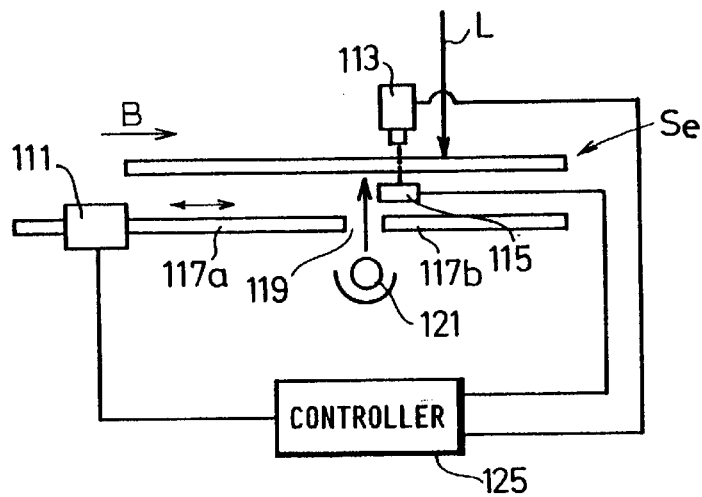
FIG. 18 is a view for describing a still further example of a preheating means.

FIG. 18 shows a still further embodiment of a type wherein a preheat temperature is adjusted by using a variable aperture. In the present embodiment, a thermo-sensitive recording medium Se is irradiated with preheating light emitted from a preheating light source 121. Then, the intensity of the light which passes through a preheat-type color-developing portion 84 (see FIG. 16), is detected by a light-emitting device 113 and a light intensity detector 115 both opposed to each other with the thermo-sensitive recording medium Se interposed therebetween. To bring the detected light intensity to a predetermined intensity, a controller 125 controls a drive mechanism 111 such as a rack and pinion to thereby displace a variable member 117 in such a way as to adjust the width of the aperture 119. As a result, the preheat temperature can be controlled so as to reach a desired temperature. If the preheat temperature is controlled in this way, then the preheat temperature control can be effected at higher speed as compared with the case where the temperature adjustment is effected by the heat roller 46. Further, since a temperature adjustment of the preheating light source 121 becomes unnecessary, the capacity of heat generated by the preheating light source 121 can be increased, thereby making it possible to reduce the generation of nonuniformity in temperature distribution to the minimum.

Figure 19:
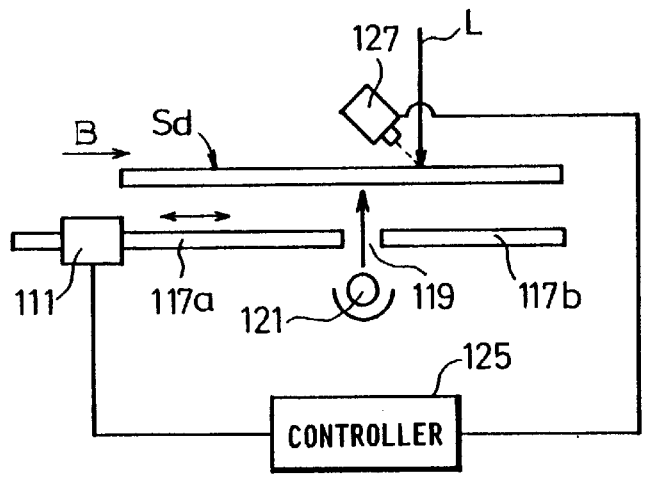
FIG. 19 is a view for describing a still further example of a preheating means.

If a radiation thermometer 127 is used as an alternative to the light-emitting device 113 and the light intensity detector 115 as shown in FIG. 19, then the preheat temperature can be controlled with high accuracy in the same manner as described above even in the case of a thermo-sensitive recording medium Sd in which the preheat-type color-developing portion 84 is not included in particular. In the embodiments shown in FIGS. 18 and 19, heating temperature control can be effected with high accuracy by directly measuring the temperature of a fixed member 117b used for defining the aperture 119 with a thermometer and by correcting, with the variable member 117a, an increase in temperature at which the thermo-sensitive recording medium Se is heated.

Figure 20:
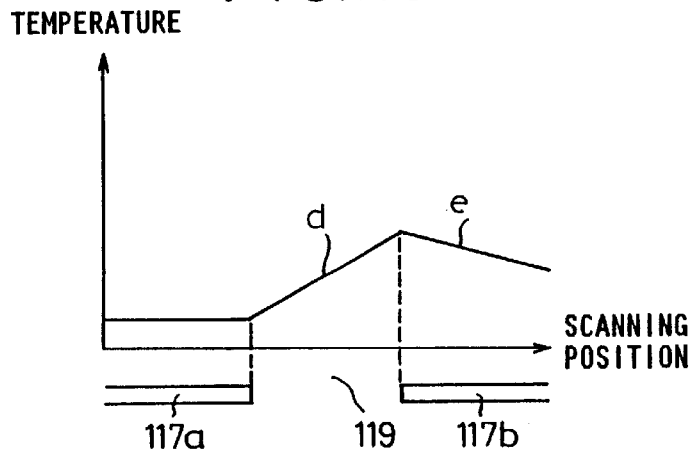
FIG. 20 is a view for describing preheat temperature characteristics obtained in the examples shown in FIGS. 18 and 19.

If the position of the laser beam L by which an image is recorded on the thermo-sensitive recording medium Se or Sd, is set to the fixed member 117b side in the embodiment shown in FIG. 18 or 19, then the image can be recorded thereon with higher accuracy. That is, a temperature characteristic d which has been obtained by effecting the preheating through the aperture 119, is represented as a temperature characteristic e as shown in FIG. 20 in the case of the fixed member 117b side. In this case, the rate of change in the temperature characteristic e is smaller than the rate of change in the temperature characteristic d. Therefore, a desired image can be recorded under a stabler preheat temperature so long as the fixed member 117b is irradiated with the recording laser beam L.

In the respective embodiments referred to above, there are provided the preheating means such as the electrode rollers 26a, 26b, the heat rollers 46, etc. which are directly brought into rolling contact with the thermo-sensitive recording mediums S, Sa, Sb, Se, and the preheating means such as the infrared heater 50, the lamp, etc. which are held in non-contact with the thermo-sensitive recording mediums Sc, Sd.

In this case, a thermal head, a thermal plate, etc. other than the electrode rollers, the heat rollers, etc. can be used as the former preheating means. When the preheating means such as the thermal plate, which is large in heat capacity, is used, the preheating may also be effected in a state in which the preheating means is not in contact with the thermo-sensitive recording mediums.

Tenth Embodiment

Figure 21:
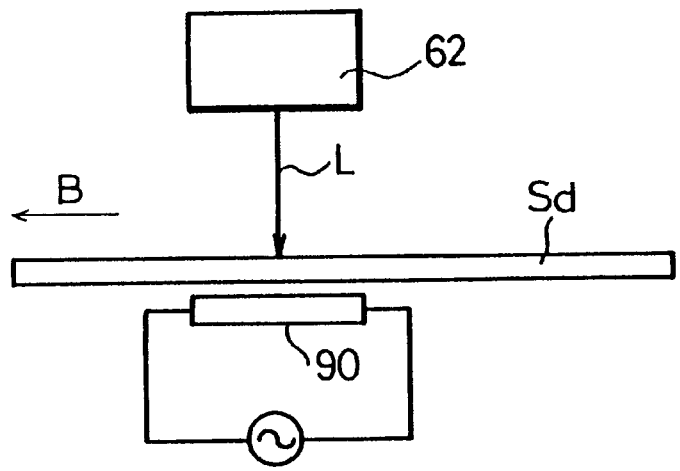
FIG. 21 is a schematic view showing the structure of a thermal recording system according to a still further embodiment of the present invention.

FIG. 21 is a view for describing a thermal recording system in which a thermal plate 90 is used. A thermo-sensitive recording medium Sd having a recording medium layer formed on a support is preheated to a predetermined temperature by the thermal plate 90 disposed so as to be spaced slightly from the thermo-sensitive recording medium Sd. In this condition, an image is recorded on the thermo-sensitive recording medium Sd by using a laser beam L emitted from a scan optical system 62. Since an interval or gap defined as an air layer, is defined between the thermo-sensitive recording medium Sd and the thermal plate 90, a thermal insulating effect can be improved, and since thus, the heat energy of the laser beam L is held in the thermo-sensitive recording medium Sd, not being dissipated to the thermal plate 90, it is possible to record the image on the thermo-sensitive recording medium Sd at high sensitivity.

Eleventh Embodiment

Figure 22:
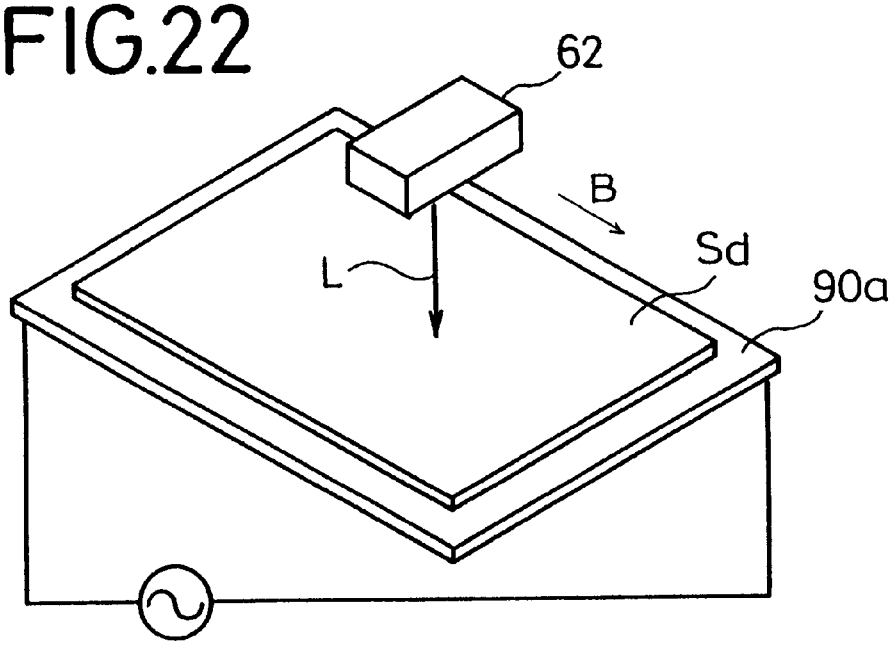
FIG. 22 is a view for describing a still further example of a preheating means.

FIG. 22 illustrates a still further embodiment in which a thermal plate 90a whose size is larger than that of a thermo-sensitive recording medium Sd with respect to each of main and auxiliary scanning directions, is used. Since, in this case, the entire surface of the thermo-sensitive recording medium Sd is uniformly heated by the thermal plate 90a, the extension of the thermo-sensitive recording medium Sd, which is caused by heat, becomes uniform as a whole. Thus, any local strain is not developed in the thermo-sensitive recording medium Sd and an image can be recorded with higher accuracy. Incidentally, the thermal plate 90a can be brought into either contact or noncontact with the thermo-sensitive recording medium Sd.

Twelfth Embodiment

Figure 23:
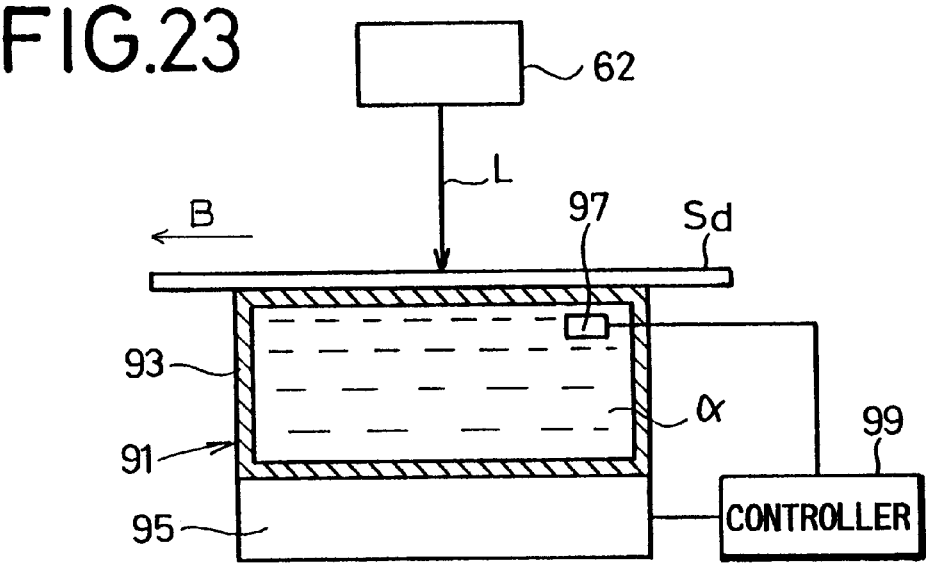
FIG. 23 is a schematic view illustrating the structure of a thermal recording system according to a still further embodiment of the present invention.

FIG. 23 shows a thermal recording system having a preheating unit 91 in which the melting point of a substance a is used. Substance a melts at a preheat temperature of a thermo-sensitive recording medium Sd and varies from a solid to a liquid. The preheating unit 91 is constructed in such a manner that a casing 93 for accommodating therein the substance a, is brought into contact with the thermo-sensitive recording medium Sd. The substance a is heated and molten by a heater 95. Further, the temperature of the substance a, which has been detected by a temperature sensor 97, is controlled so as to be maintained at a constant temperature by a controller 99. Since, at this time, the temperature of the melting point at the time that the substance a varies from the solid to the liquid, is stable to the energy applied from the outside, highly accurate temperature control can be easily effected. Incidentally, examples of the substance a may include $2N_2H_4.H_2SO_4$ (melting point of about 85° C.), low-melting solder (melting point of about 100° C.), thio-acetamide (melting point of 115° C.), tri-bromo acetic acid (melting point of about 135° C.), and In (melting point of about 155° C.).

Thirteenth Embodiment

Figure 24:
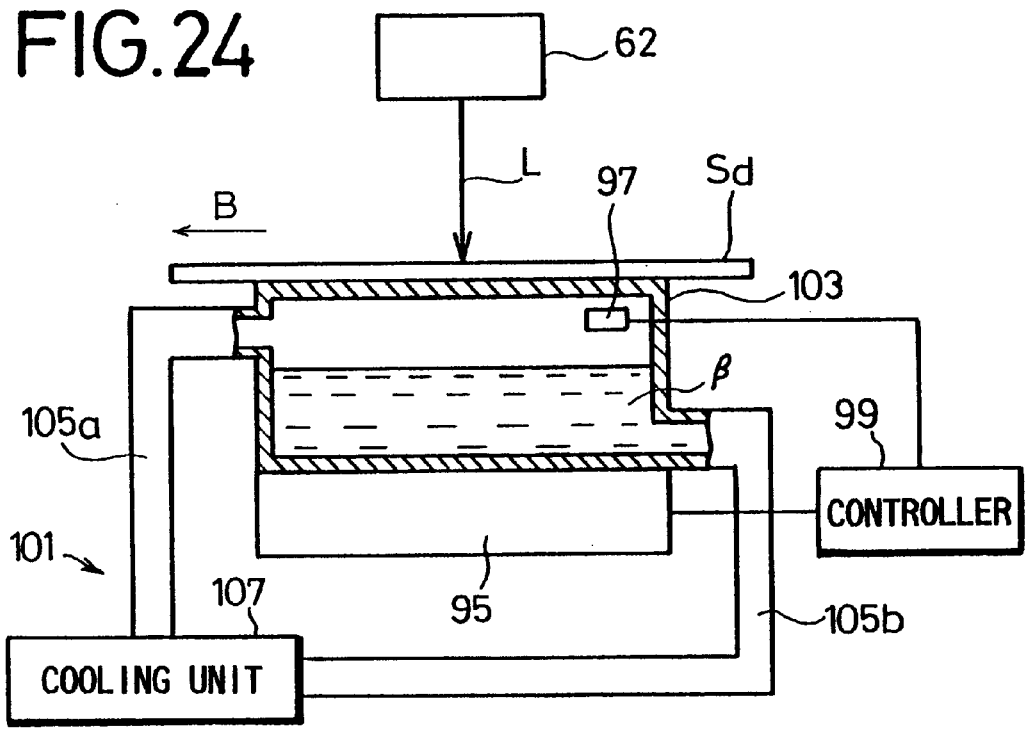
FIG. 24 is a schematic view depicting the structure of a thermal recording system according to a still further embodiment of the present invention.

FIG. 24 illustrates a thermal recording system having a preheating unit 101 in which the boiling point of a substance β is used. Substance β boils at a preheat temperature of a thermo-sensitive recording medium Sd and varies from the liquid to the gas. The preheating unit 101 is constructed such that a casing 103 for accommodating therein the substance β, is brought into contact with the thermo-sensitive recording medium Sd. The substance β is heated and boiled by a heater 95. Further, the temperature of the substance β, which has been detected by a temperature sensor 97, is controlled so as to be kept at a constant temperature under the control of a controller 99. Then, the substance β is supplied via a line 105a to a cooling unit 107 where it is cooled. Thereafter, the substance p is returned to the casing 103 through a line 105b again. Since, at this time, the temperature of the boiling point at the time that the substance β changes from the liquid to the gas, is stable to the energy applied from the outside, highly accurate temperature control can be easily effected. Incidentally, examples of the substance β include ethyl alcohol (boiling point of about 78.5° C.), water (boiling point of about 100° C.), acetic acid (boiling point of about 118.1° C.), acetic anhydride (boiling point of about 140° C.).

Fourteenth Embodiment

Figure 25:
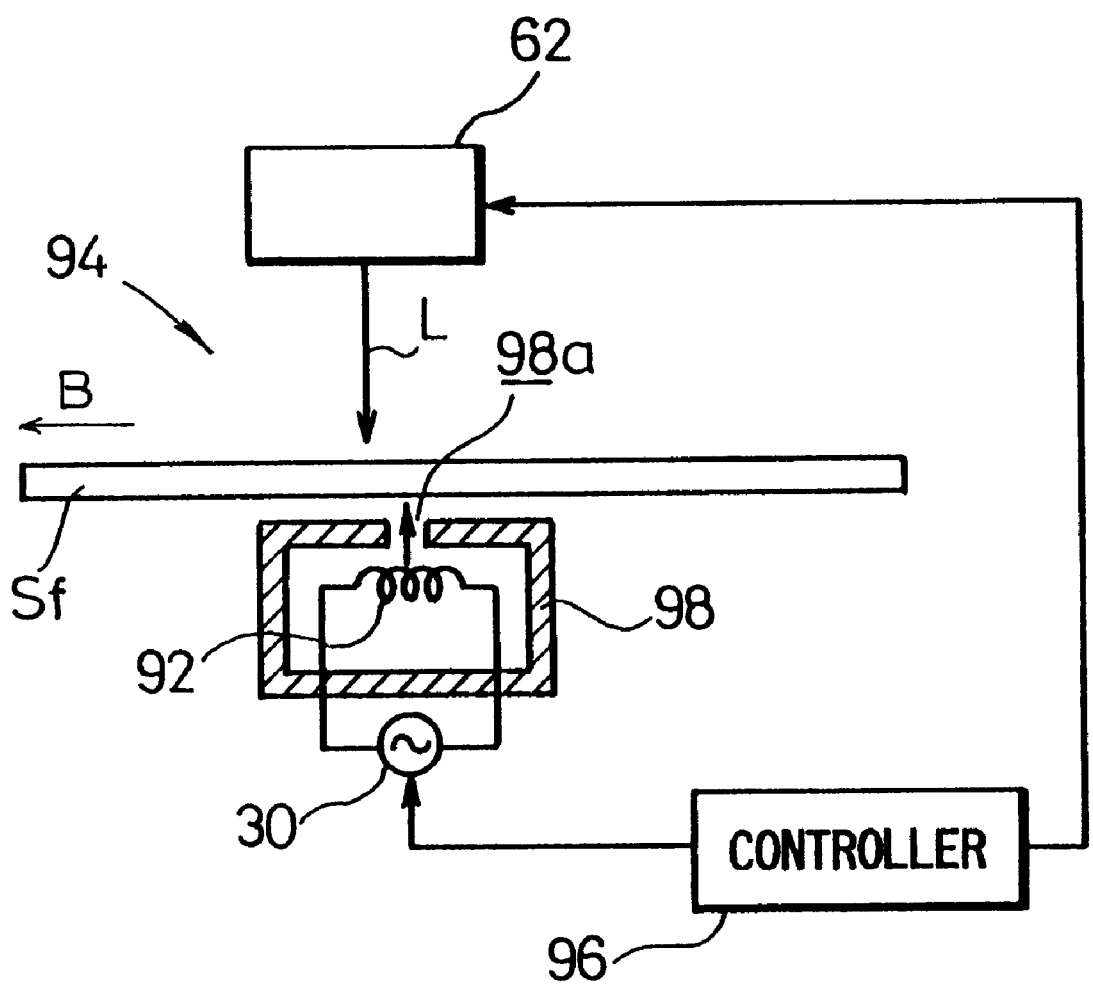
FIG. 25 is a schematic view illustrating the structure of a thermal recording system according to a still further embodiment of the present invention.

On the other hand, other means using electromagnetic waves or the like may be used as a preheating means employed under a non-contact condition. FIG. 25 schematically shows the structure of a thermal recording system 94 in which a high-frequency induction coil 92 is used as a preheating means. In the thermal recording system 94, the high-frequency induction coil 92 is provided close to a thermo-sensitive recording medium Sf having a support made of metal. Further, the high-frequency induction coil 92 is energized under the control of a controller 96 so as to preheat the thermo-sensitive recording medium Sf. The high-frequency induction coil 92 is surrounded by a slit member 98 having a slit 98a defined therein so as to extend along a preheating portion of the thermo-sensitive recording medium Sf, and held in a shielded state. Accordingly, an image, which does not include stain or the like and is excellent in accuracy, is formed on the thermo-sensitive recording medium Sf because only a portion of the thermo-sensitive recording medium Sf, which is required to record the image, is preheated. Obviously alternative means of preheating, such as high frequency induction plates bracketing medium Sf, may be employed.

Figure 26:
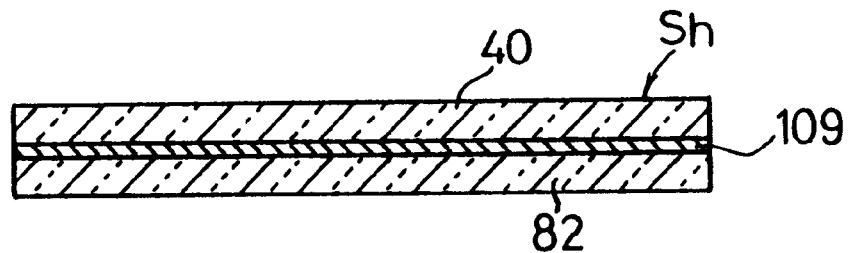
FIG. 26 is a view for describing the structure of another example of a thermo-sensitive recording medium employed in the thermal recording system shown in FIG. 25.
Figure 27:
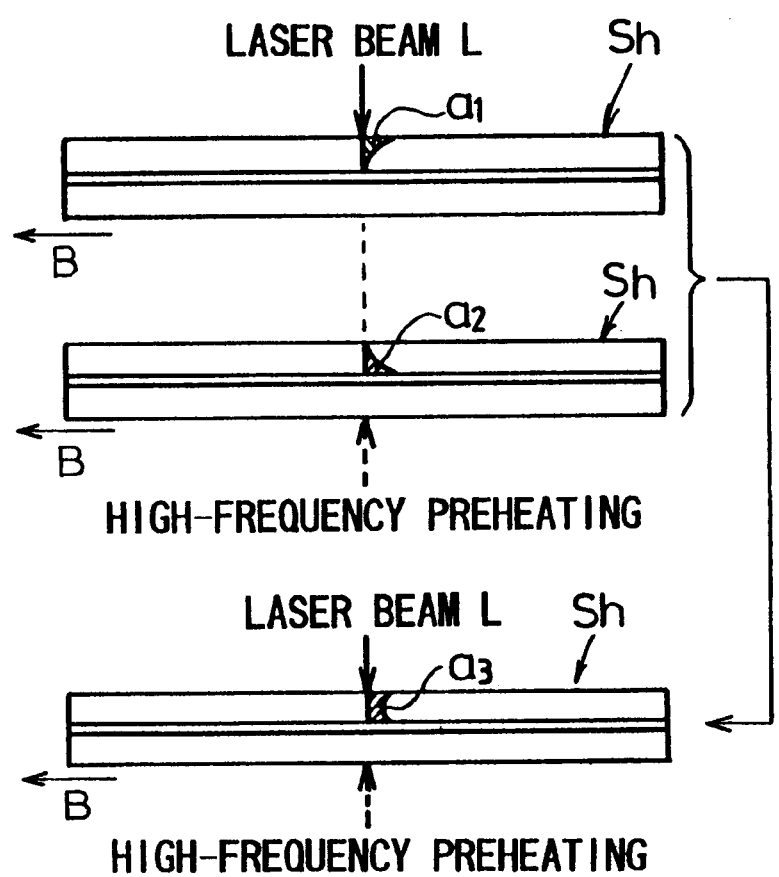
FIG. 27 is a view for describing the distribution of heat energy applied to the thermo-sensitive recording medium shown in FIG. 26.

In FIG. 26, a thermo-sensitive recording medium Sh having a conductive layer 109 defined between a thermo-sensitive layer 40 and a support 82 and made of such a material as a transparent electrode, is used as an alternative to the thermo-sensitive recording medium Sf employed in the embodiment shown in FIG. 25. A distribution $a_1$ of heat energy given by the laser beam L and a distribution $a_2$ of heat energy produced by the high-frequency induction coil 92 are represented as shown in FIG. 27, where the direction in which the thermo-sensitive recording medium Sh is fed is shown by arrow A. Accordingly, a distribution $a_3$ of heat energy, which is obtained by combining $a_1$ and $a_2$, extends substantially in a uniform state from the surface of the thermo-sensitive layer 40 to a deeper portion thereof. Further, since such a distribution can be locally achieved, a high-density image recording can be carried out.

Fifteenth Embodiment

Figure 28:
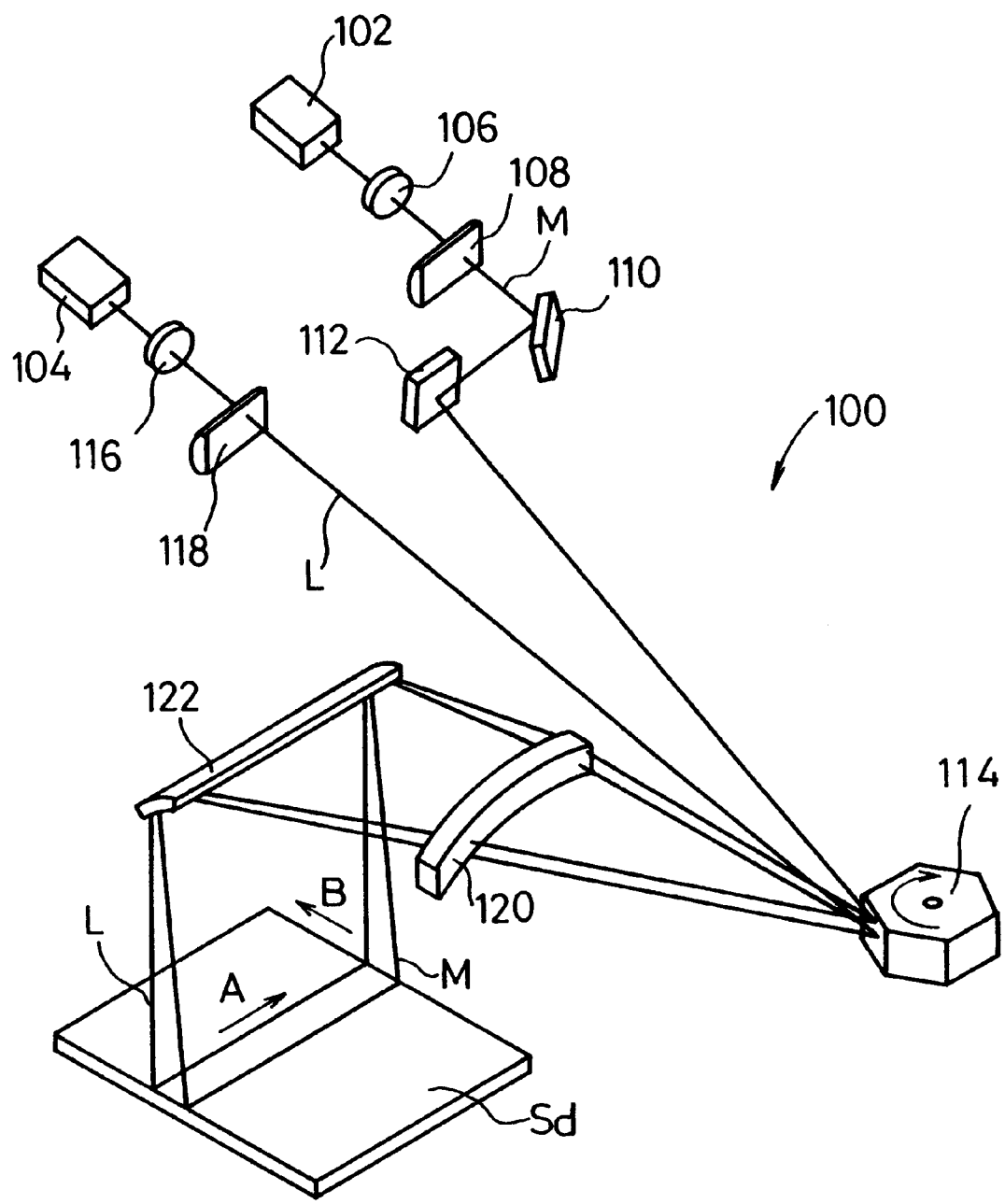
FIG. 28 is a schematic view showing the structure of a thermal recording system according to a still further embodiment of the present invention.

Further, a thermal recording system 100 using a preheating laser beam M can also be used as shown in FIG. 28. Described specifically, the thermal recording system 100 has a laser diode 102 for generating the preheating laser beam M and a laser diode 104 for producing a recording laser beam L. The laser beam M is introduced into a polygon mirror 114 through a collimator lens 106, a cylindrical lens 108 and mirrors 110, 112 in that order. On the other hand, the laser beam L is transmitted to the polygon mirror 114 through a collimator lens 116 and a cylindrical lens 118. Then, a thermo-sensitive recording medium Sd is irradiated with the respective laser beams M, L reflected by the polygon mirror 114 through an fθ lens 120 and a cylindrical lens 122. In this case, the preheating laser beam M scans the upstream side, extending in the auxiliary scanning direction, of the thermo-sensitive recording medium Sd as seen from the scanning position of the recording laser beam L, and heats the thermo-sensitive recording medium Sd to a temperature immediately before the color development. As a result, an optical system ranging from the polygon mirror 114 to the thermo-sensitive recording medium Sd can be used in common. Further, since the laser beam M can accurately heat only the required portion of the thermo-sensitive recording medium Sd, an image excellent in accuracy can be obtained. Incidentally, the preheating can also be effected by shifting the scanning positions of the laser beams M and L on the thermo-sensitive recording medium Sd in the main scanning direction as well as in the auxiliary scanning direction.

In the embodiment shown in FIG. 28, the laser beams L, M may also be introduced into the thermo-sensitive recording medium Sd through the opposite reflecting surfaces of the polygon mirror 114 so as to simultaneously effect both the preheating and the image recording. In this case, the scanning directions of the preheating laser beam M and the recording laser beam L are set in the opposing relationship.

Sixteenth Embodiment

Figure 29:
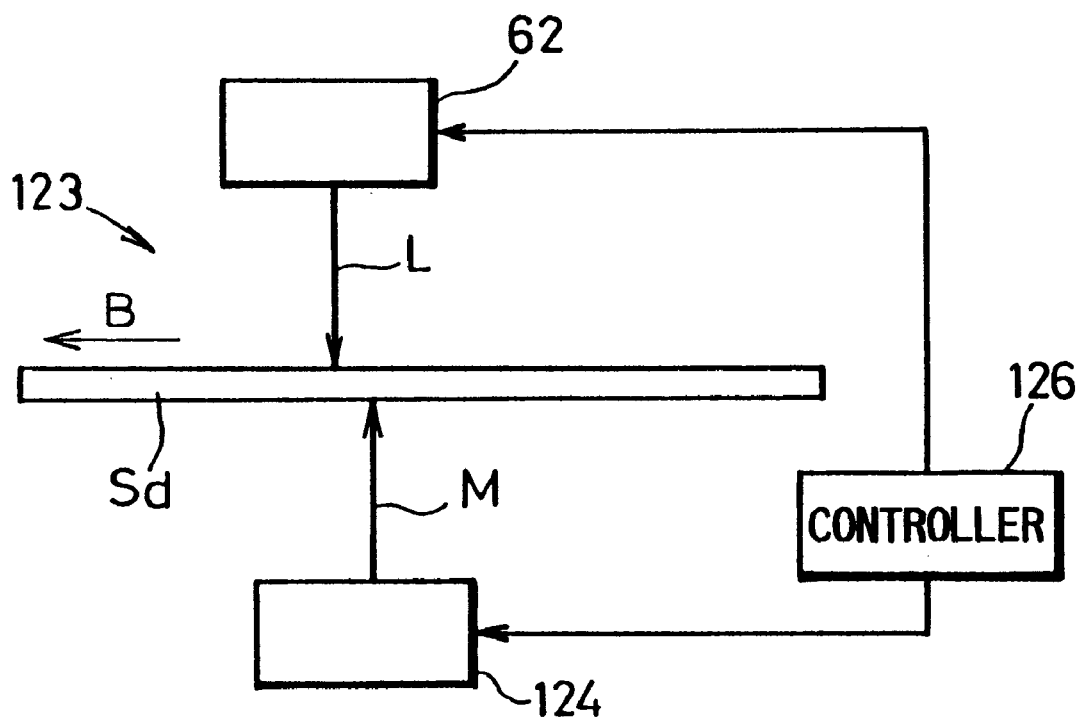
FIG. 29 is a schematic view illustrating the structure of a thermal recording system according to a still further embodiment of the present invention.

Furthermore, as shown in FIG. 29, a thermal recording system 123 may be comprised of a scan optical system 62 controlled by a controller 126, for outputting a recording laser beam L, and a scan optical system 124 constructed in a manner similar to the scan optical system 62 and controlled by the controller 126, for outputting a preheating laser beam M.

Seventeenth Embodiment

Figure 30:
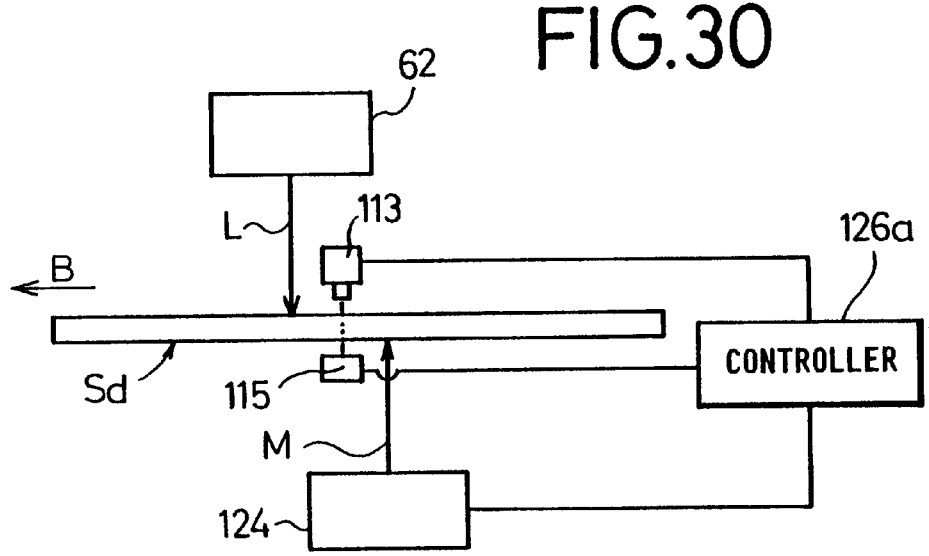
FIG. 30 is a view for describing a still further example of a preheating means.

FIG. 30 shows a still further embodiment of a type wherein a scan optical system 124 for outputting a laser beam M is used as an alternative to the preheating light source 121 employed in the ninth embodiment (see FIG. 18). In this case, the transmissivity, i.e., the rate of light transmitted through the thermo-sensitive recording medium Se varies due to the irradiation of the thermo-sensitive recording medium Se with the laser beam M. That is, the so-called haze effect is exhibited that a light scattering characteristic varies according to the intensity of the laser beam M emitted from the scan optical system 124. (However, it should not be limited to the laser beam M to obtain the haze effect, e.g. other preheating means can be used to obtain the haze effect as described herein, such as heat roller, heat coil, etc.) Therefore, such a variation is detected as the intensity of the transmitted light by a light-emitting device 113 and a light intensity detector 115 both opposed to each other with the thermo-sensitive recording medium Se interposed therebetween. Then, the output level of the laser beam M is controlled by a controller 126a to bring the detected intensity of transmitted light to a predetermined intensity. In doing so, a preheat temperature can be adjusted so as to reach the optimum temperature.

Eighteenth Embodiment

Figure 31:
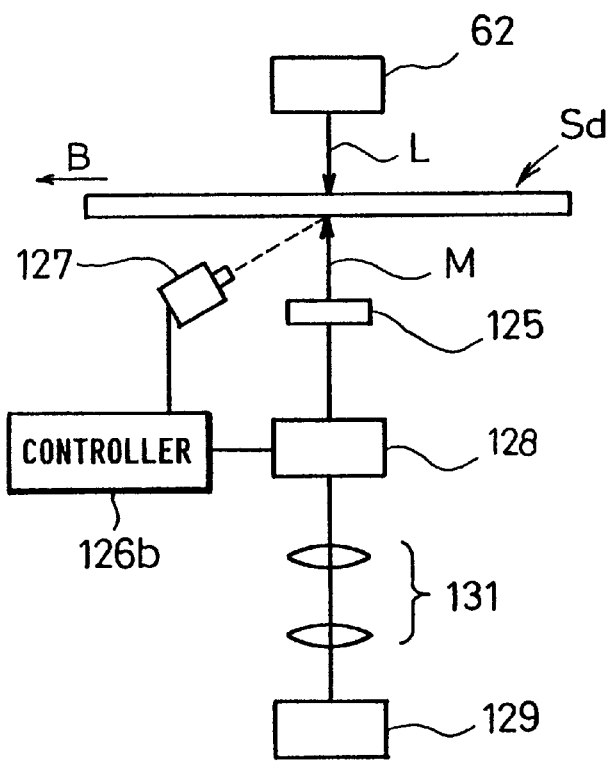
FIG. 31 is a view for describing a still further example of a preheating means.

FIG. 31 illustrates a still further embodiment in which a preheat temperature of a thermo-sensitive recording medium Se is detected by a radiation thermometer 127 and the intensity of a laser beam M is controlled based on the detected preheat temperature. The laser beam M emitted from a light source 129 is focused by condenser lenses 131 and subjected to the intensity modulation by an acoustooptic modulator (AOM) 128. Thereafter, the so-processed laser beam M is diverged in a main scanning direction (i.e., in the direction orthogonal to the direction indicated by the arrow) through a cylindrical lens 125 so as to be radiated into the thermo-sensitive recording medium Se. Then, a controller 126b controls the AOM 128 so that the preheat temperature which has been detected by the radiation thermometer 127, is set to a desired temperature. Since, in this case, the laser beam M is focused by the condenser lenses 131 and diverged only in the main scanning direction through the cylindrical lens 125, only a necessary portion of the thermo-sensitive recording medium Se can be efficiently preheated.

When, on the other hand, a transverse single-mode laser diode is used as a source for generating the recording laser beam L and a transverse multi-mode laser diode is used as a source for generating the preheating laser beam M, a preheating range can be made wide and an image recording region can be easily sharpened. Further, the diameter of the laser beam L may be set shorter than that of the laser beam M by using a lens or the like. Moreover, a laser beam M of a high output level can be obtained by pulse-modulating the laser beam M in synchronism with a pixel frequency of an image to be recorded.

Nineteenth Embodiment

Figure 32:
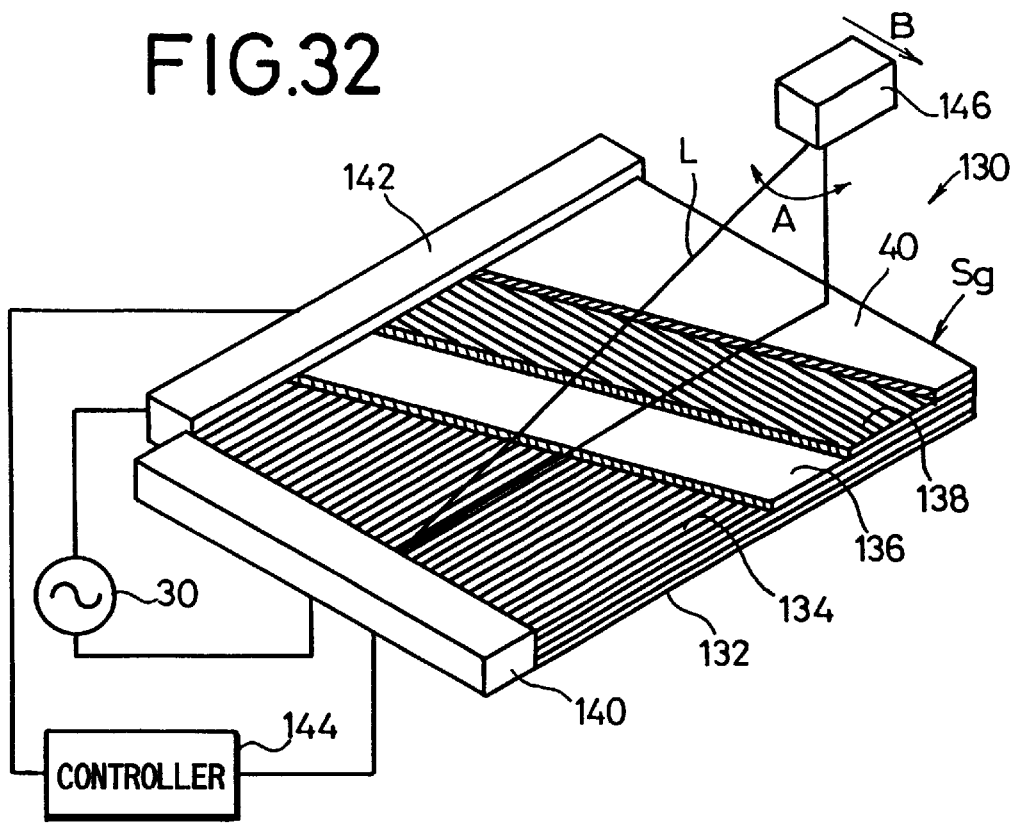
FIG. 32 is a schematic view depicting the structure of a thermal recording system according to a still further embodiment of the present invention.
Figure 33:
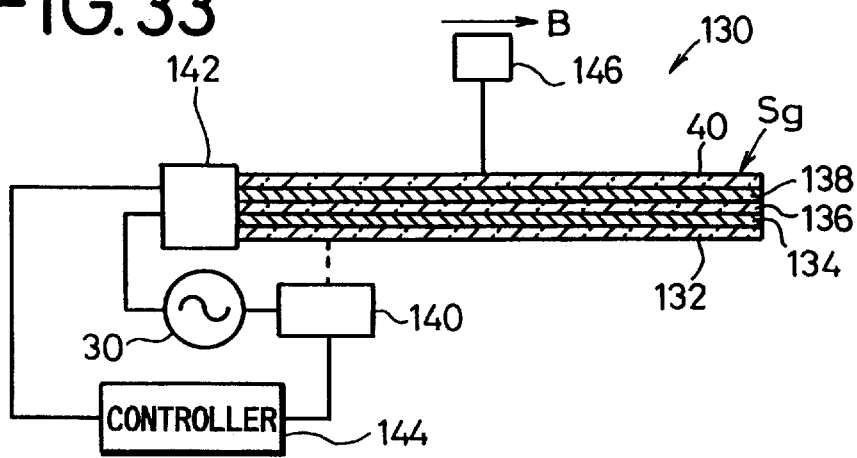
FIG. 33 is a view for describing the thermal recording system shown in FIG. 32.

FIGS. 32 and 33 respectively show a thermal recording system 130 according to a still further embodiment of the present invention. The thermal recording system 130 makes use of a thermo-sensitive recording medium Sg having electrodes arranged in the form of a matrix. The thermo-sensitive recording medium Sg comprises a first electrode layer 134 formed on a support 132 and having a plurality of electrodes extending in parallel along the main scanning direction, a conductive resistance heating or heat generating layer 136 formed on the first electrode layer 134, a second electrode layer 138 formed on the resistance heat generating layer 136 and having a plurality of electrodes extending in parallel along the auxiliary scanning direction, and a thermo-sensitive layer 40 formed on the second electrode layer 138.

In the thermal recording system 130, a first electrode scanning unit 140 is electrically connected to the first electrode layer 134 of the thermo-sensitive recording medium Sg. Further, a second electrode scanning unit 142 is electrically connected to the second electrode 138. A power source 30 is energized to enable the electrical connection between the first and second electrode scanning units 140 and 142. In this case, a controller 144 controls the first and second electrode scanning units 140, 142 so that the electrodes to be energized are selected. As a result, the resistance heat generating layer 136 between the selected electrodes generates heat, so that a desired region of the thermo-sensitive recording medium Sg is preheated. On the other hand, a desired image is recorded on the thermo-sensitive recording medium Sg preheated as described above by scanning the thermo-sensitive recording medium Sg along the main scanning direction with a laser beam L outputted from a recording unit 146 fed for the auxiliary scanning in the direction indicated by the arrow B.

In the aforementioned embodiment, only a desired portion of the thermo-sensitive recording medium Sg can be preheated by arranging the plurality of electrodes in matrix form. Accordingly, this preheating process is economical as compared with a process for preheating the overall surface of the thermo-sensitive recording medium Sg. When the overall surface of the thermo-sensitive recording medium Sg is preheated at a time, a temperature gradient is developed in a recording surface. However, only a necessary recording portion immediately before the image recording can be preheated at a constant temperature by controlling the first and second electrode scanning units 140, 142 and displacing a heating portion in turn in the auxiliary scanning direction (i.e., in the direction indicated by the arrow B) while following the scanning based on the laser beam L. Therefore, the temperature control can be effected economically and with high accuracy. Thus, the recording of an image on the thermo-sensitive recording medium Sg can be accurately carried out.

Twentieth Embodiment

Figure 34:
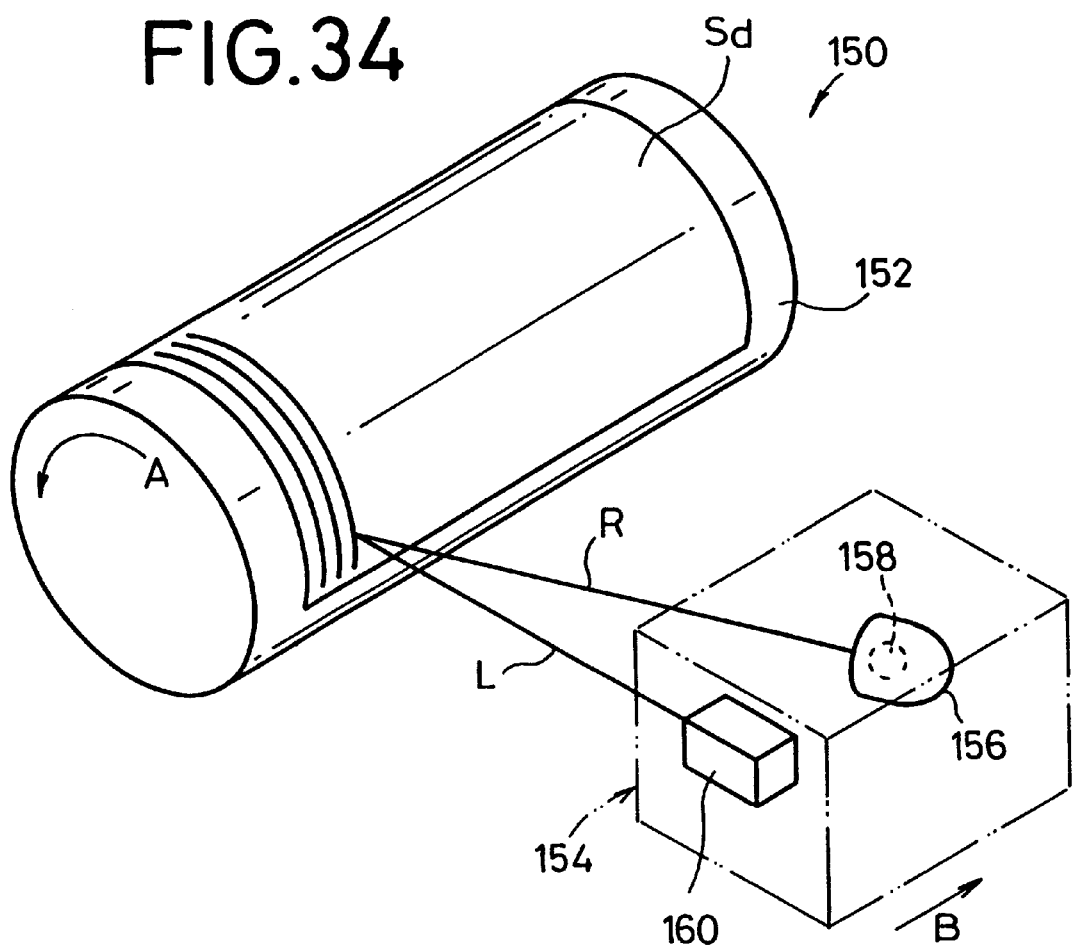
FIG. 34 is a schematic view showing the structure of a thermal recording system according to a still further embodiment of the present invention.

FIG. 34 shows a drum-type thermal recording system 150. In the thermal recording system 150, a thermo-sensitive recording medium Sd is mounted on the outer peripheral surface of a drum 152 rotated in the direction indicated by the arrow A. An image is two-dimensionally recorded on the thermo- sensitive recording medium Sd by a scanning unit 154 displaced in the direction indicated by the arrow B. Described specifically, the scanning unit 154 accommodates therein a halogen lamp 158 and an associated reflector 156 used as a preheating means, and a recording laser 160. The thermo-sensitive recording medium Sd is preheated by infrared radiation R emitted from the halogen lamp 158. Then, the preheated portion is irradiated with a laser beam L emitted from the recording laser 160, thereby recording the image on its portion. In this case, the infrared radiation R can efficiently preheat only a recording portion of the thermo-sensitive recording medium Sd. Further, the scanning unit 154 can be extremely simplified in structure.

Figure 35:
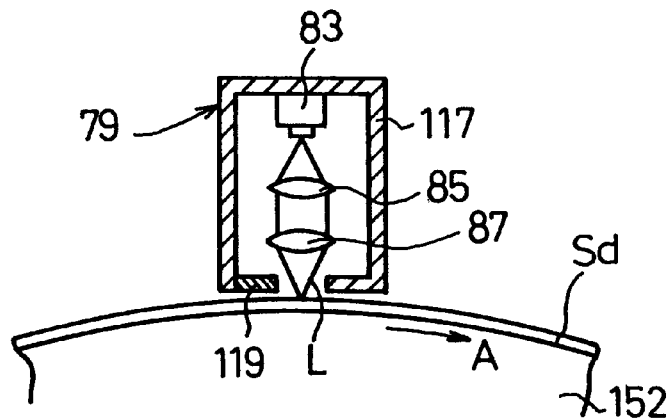
FIG. 35 is a view for describing the structure of another example of a scanning unit employed in the thermal recording system shown in FIG. 34.

Incidentally, the scanning unit 154 may also be constructed as shown in FIG. 35. FIG. 35 shows a scanning unit 79 composed of a preheating means and a heating-beam generating means both combined into a single unit. The scanning unit 79 has a laser diode 83 for producing a recording laser beam L, a collimator lens 85 for collimating the laser beam L, and a condenser lens 87 for causing the laser beam L to converge on the recording portion of the thermo-sensitive recording medium Sd, all of which are surrounded by a casing 117. Further, a heater 119 such as a thermal head or the like is integrally mounted to a portion of the casing 117, which is close to the upstream side of the thermo-sensitive recording medium Sd. The previous stage of the recording portion of the thermo-sensitive recording medium Sd is preheated by the heater 119 and then heated with the laser beam L emitted from the laser diode 83, thereby recording an image on the recording portion. Since, in this case, the heater 119 preheats a recording surface of the thermo-sensitive recording medium Sd irradiated with the laser beam L in the same manner as in FIG. 34, the thermal efficiency is raised. Further, the integral formation of both the preheating means and the heating-beam generating means greatly contributes to a size reduction in the thermal recording system.

Twentyfirst Embodiment

Figure 36:
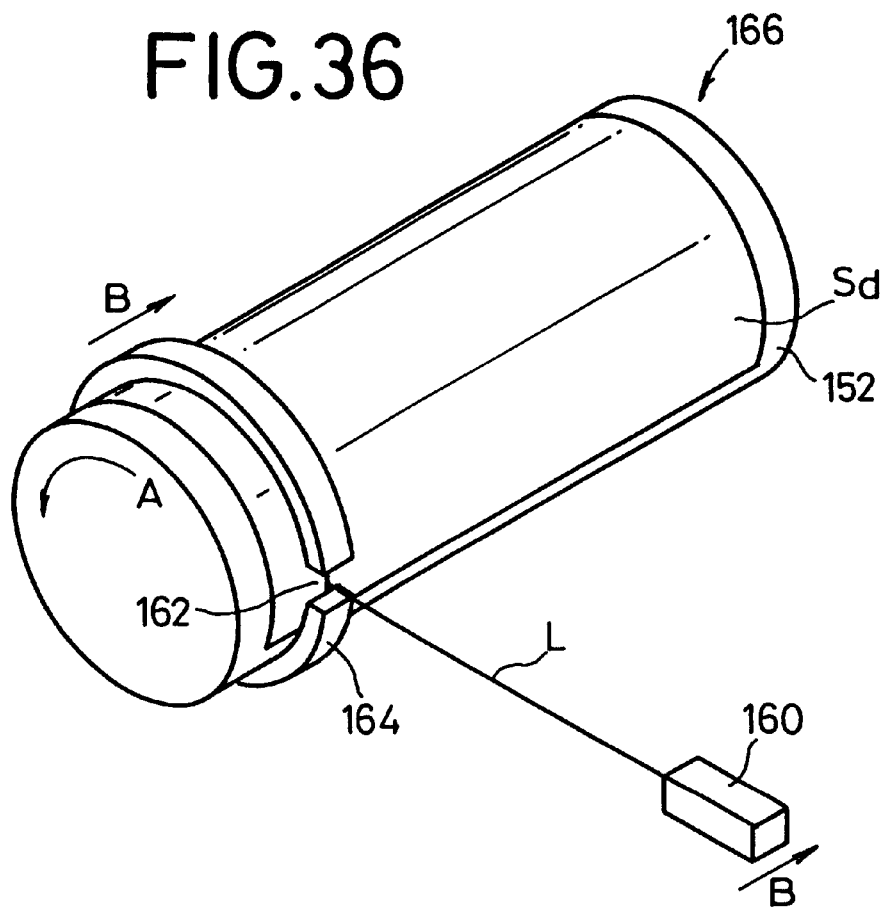
FIG. 36 is a schematic view illustrating the structure of a thermal recording system according to a still further embodiment of the present invention.
Figure 37:
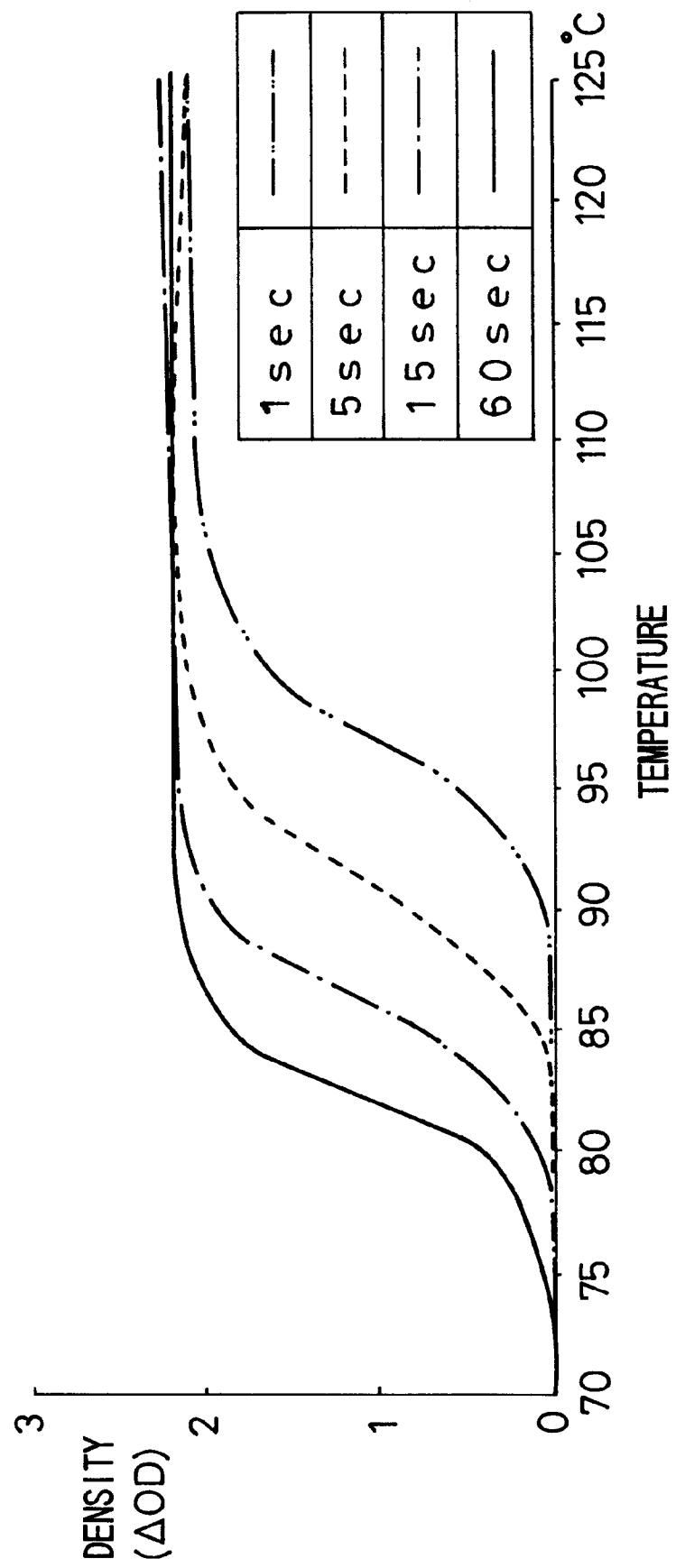
FIG. 37 is a view for describing a density characteristic of the thermo-sensitive recording medium with respect to the temperature and time.

FIG. 36 shows a thermal recording system 166 in which the preheating means shown in FIG. 34 is provided separately from the heating means, that is, a ring-shaped preheating member 164 having a gap or interval 162 defined in a part thereof is loose-fit on the outer peripheral surface of a drum 152 and then fed for auxiliary scanning in the direction indicated by the arrow B together with a recording laser 160. Since a recording portion is surrounded by the ring-shaped preheating member 164 in this case, the dissipation of heat can be reduced. Further, since the thermo-sensitive recording medium Sd can be stably preheated, a desired image can be highly accurately recorded.

The preheating and heating directions may be set to any one or all surfaces of the thermo-sensitive recording medium in the above respective embodiments.

The thermo-sensitive recording medium in the above respective embodiments develops color corresponding to thermal energy applied thereto. Specifically, it develops color as a function of a preheating temperature and a preheating time. The density characteristics with respect to the temperature and the time is shown in FIG. 3. Accordingly, there are two ways of developing color in the thermo-sensitive recording medium, one with an elevated temperature at a constant time, the other with an elongated time at a constant temperature, either being usable.

Figure 38:
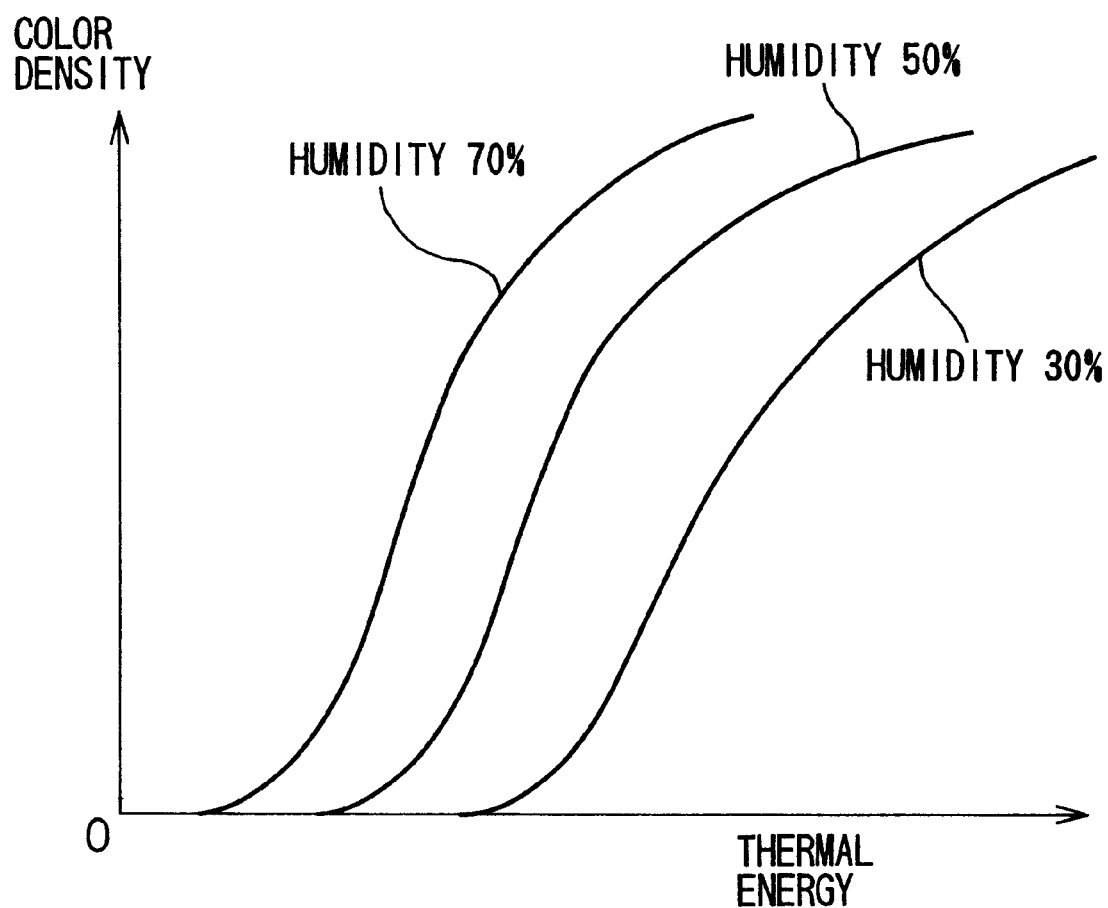
FIG. 38 is a view for describing a density characteristic of the thermo-sensitive recording medium with respect to the thermal energy when the temperature and time varies.

Further, the color density of the thermo-sensitive recording medium S depends also on the humidity. The relationship between the density and the thermal energy at various humidity is shown in FIG. 38. As understood from FIG. 38, the sensitivity of the thermo-sensitive recording medium S becomes higher as the humidity increases. It is preferable to adjust thermal energy applied to the thermo-sensitive recording medium S by making use of this characteristic.

Twentysecond Embodiment

A thermal recording system according to a twentysecond embodiment of the present invention will be described below, in which the thermo-sensitive recording medium is re-heated after an image or the like is recorded thereon with a laser beam. Those parts in the twentysecond embodiment which are identical to those in the above-described embodiments are denoted by the identical reference signs, and not described in detail below.

Figure 39:
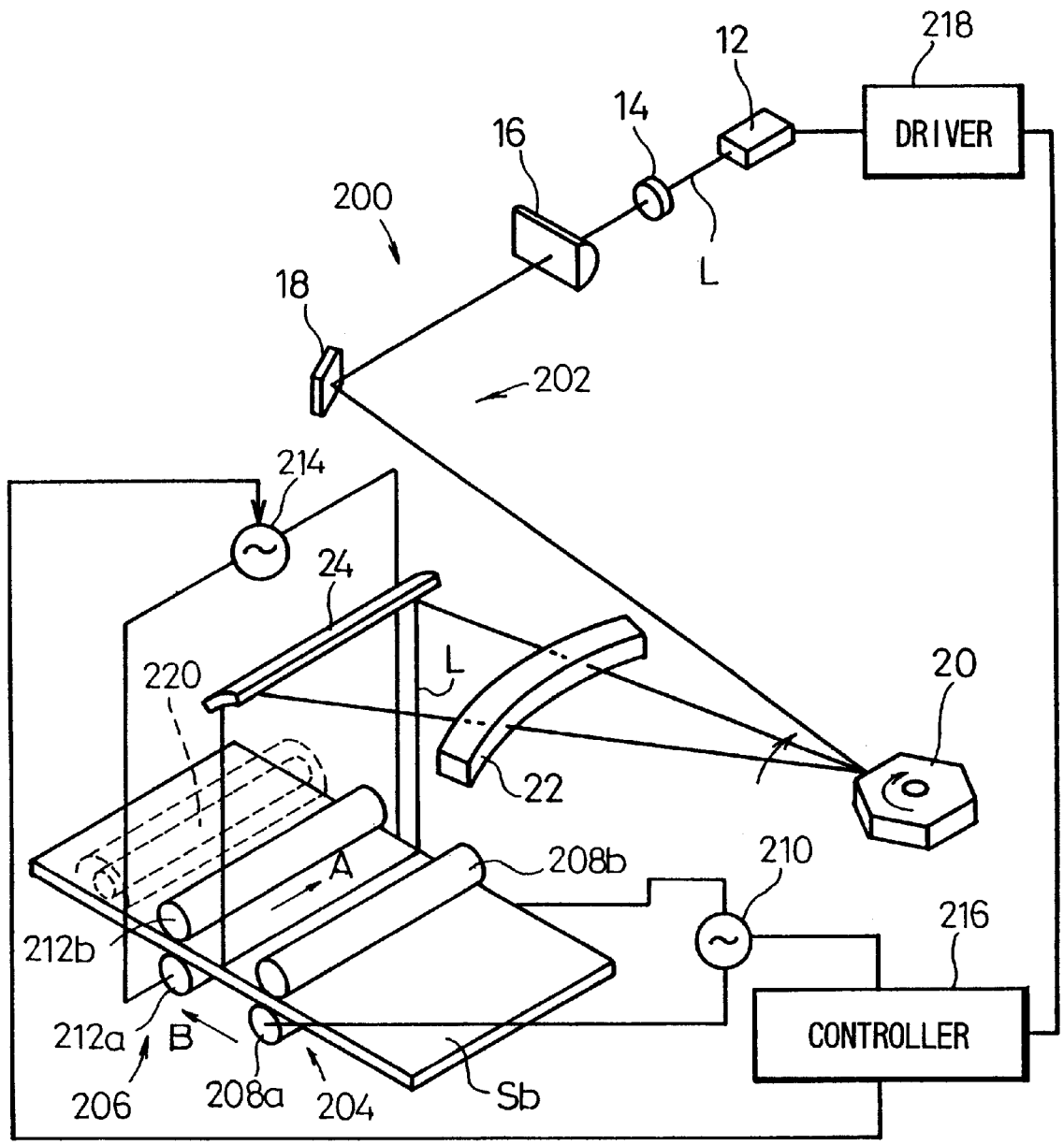
FIG. 39 is a schematic view illustrating the structure of a thermal recording system having post-recording heating means according to an embodiment of the present invention.

FIG. 39 shows a thermal recording system 200 which basically comprises a scanning optical system 202 for scanning the thermo-sensitive recording medium Sb with a laser beam L, a preheater 204 disposed upstream in the auxiliary scanning direction of the thermo-sensitive recording medium Sb from a position to which the laser beam L is irradiated, and a post-recording heater 206 disposed downstream in the auxiliary scanning direction of the thermo-sensitive recording medium Sb from a position to which the laser beam L is irradiated. The preheater 204 has a pair of heating rollers 208a, 208b for gripping therebetween the thermo-sensitive recording medium Sb, and a power supply 210 for supplying electric current to one of the heating rollers 208a. The post-recording heater 206 has a pair of heating rollers 212a, 212b for gripping therebetween the thermo-sensitive recording medium Sb, and a power supply 214 for supplying electric current to one of the heating rollers 212a. The power supplies 210, 214 are controlled by a controller 216, and a laser diode 12 is also controlled by the controller 216 through a driver 218.

The thermo-sensitive recording medium Sb is provided with coloring characteristics represented by curves a and b in FIG. 3, which are described later.

Operation of the thermal recording system 200 will be described below.

The controller 216 energizes the power supply 210 to preheat the thermo-sensitive recording medium Sb which is gripped between the heating rollers 208a, 208b and transported for auxiliary scanning. Thereby, the thermo-sensitive recording medium Sb is preheated to a temperature immediately before a color-developing temperature. The curve a in FIG. 3 shows a relationship between the temperature applied to the thermo-sensitive recording medium Sb and the density of color developed after application of the temperature for a sufficiently long time. In FIG. 3, T1 is a preheating temperature immediately before a color-developing temperature.

Then, the controller 216 energizes the laser diode 12 through the driver 218. The laser beam L emitted from the laser diode 12 main-scans the thermo-sensitive recording medium Sb in the direction indicated by the arrow A. Thereby, color is developed in the thermo-sensitive recording medium Sb according to the curve b in FIG. 3, and an image in high gradation is formed.

Next, the thermo-sensitive recording medium Sb in which the high-gradation image has been recorded is gripped and re-heated between the heating rollers 212a, 212b, while transported in the direction indicated by the arrow B for auxiliary scanning. Specifically, the controller 216 energizes the power supply 214 to heat the thermo-sensitive recording medium Sb to a temperature T1' which is immediately before the color-developing temperature, with the heating rollers 212a, 212b which constitute the post-recording heater 206. Thereby, a coloring reaction in the thermo-sensitive recording medium Sb is accelerated, and the density of color in the thermo-sensitive recording medium Sb is increased as shown by the curve a in FIG. 3.

The manner in which a desired density of color in the thermo-sensitive recording medium Sb is realized will be described. When thermal energy is applied to the thermo-sensitive recording medium Sb by the laser beam L, color is developed according to the curve b in FIG. 3. Thereafter, by raising the temperature again to T1', the density of color in the thermo-sensitive recording medium Sb is increased according to the curve a in FIG. 3. Therefore, when Da is the desired density, the temperature of the thermo-sensitive recording medium Sb is controlled to attain a temperature of T in FIG. 3 by the laser beam L at which a density of Db is attained according to the curve b.

The post-recording heating temperature may be similar to the preheating temperature (40°~275°, preferably 40°~150°, and more preferably 60°∫130°), and the heating time may be similarly 30 sec. or less, or preferably less than 10 sec.

As described above, it becomes possible to complete the coloring reaction in a relatively short time to obtain an image with the density of color less susceptible to deterioration with time or stable for a long time, by recording the image on the thermo-sensitive recording medium Sb by the laser beam L and thereafter heating it again to a temperature immediately before the coloring temperature.

An image with a further stable color density can be obtained by selecting an ultraviolet-hardening type microcapsule for the thermo-sensitive layer of the thermo-sensitive recording medium Sb, disposing an ultraviolet lamp 220 downstream from the recording position 206 in the auxiliary scanning direction, as shown in FIG. 39, and by fixing the image with an ultraviolet ray after recording the image and the post-recording heating. That is, by effecting the post-recording heating after decomposing the microcapsule with the laser beam L to develop color, and irradiating the ultraviolet ray to the thermo-sensitive recording medium Sb, the residual microcapsule are hardened and prevented from further decomposing. Therefore, it becomes possible to obtain an image with the density of color less susceptible to deterioration with time or stable for a long time.

In the arrangement shown in FIG. 39, since the thermo-sensitive recording medium Sb is gripped and transported by the heating rollers 208a, 208b, 212a and 212b, it becomes possible to prevent the thermo-sensitive recording medium Sb from deformation or correct the deformed medium Sb.

The post-recording heating means can be constructed similarly to those preheating means shown in FIGS. 1, 4, 6A to 6C, 7 to 17, 21 to 26 or 28 to 36, or can be used with them.

Twentythird Embodiment

Figure 40:
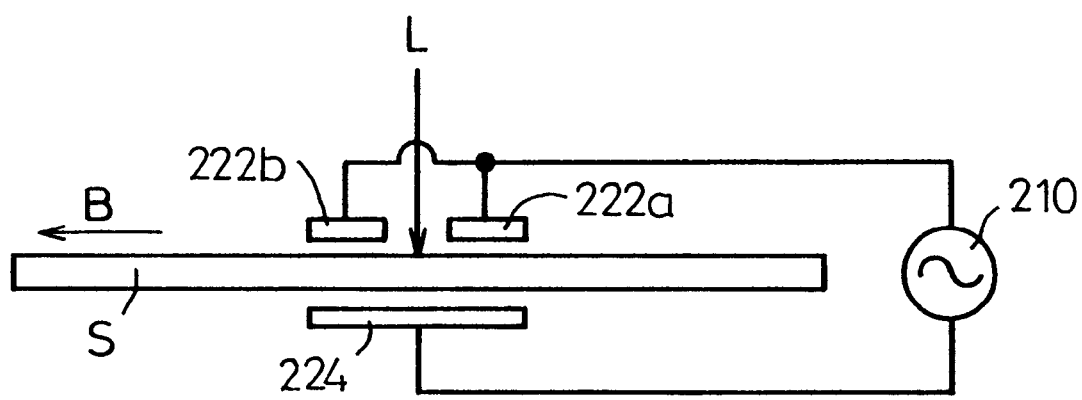
FIG. 40 is a view for describing another example of post-recording heating means.

FIG. 40 shows a thermal recording system according to a twentythird embodiment of the present invention, in which a high-frequency induction heating is used for the preheating and post-recording heating. The thermo-sensitive recording medium Sb which contains no metal parts is provided with a pair of electrodes 222a, 222b disposed near the recording portion on the surface thereof to which the laser beam L is irradiated, and an electrode 224 on the rear surface opposing to the electrodes 222a, 222b. In this arrangement, the thermo-sensitive recording medium Sb is subjected to pre-heating and post-recording heating with a high-frequency electric field applied to the electrodes 222a, 222b and 224 from a power supply 210. An image is recorded on the thermo-sensitive recording medium Sb by the laser beam L while it is simultaneously being preheated to a desired temperature by the induction energy generated between the electrodes 222a and 224. Thereafter, the thermo-sensitive recording medium Sb is subjected to the post-recording heating by the induction energy generated between the electrodes 222b and 224, for thereby stabilizing the density of color.

In the arrangement described above, the high-frequency electric field in the form of pulses can be applied to the electrodes 222a, 222b and 224, to thereby heat the thermo-sensitive recording medium Sb with pulsations of high temperature. It is known that the sensitivity of the thermo-sensitive layer used in the thermo-sensitive recording medium Sb increases when it is heated in a pulsating manner. In the induction heating, since metallic material having a large heat conductivity is not needed for the thermo-sensitive recording medium Sb, the local temperature of the thermo-sensitive recording medium Sb can be controlled precisely in a short time. Therefore, it becomes possible to record images highly accurately at a high speed.

Twentyfourth Embodiment

Figure 41:
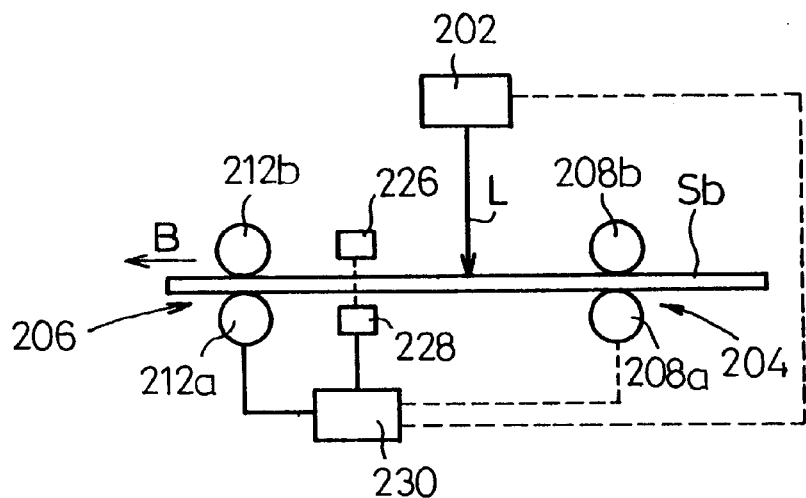
FIG. 41 is a schematic view illustrating the structure of a thermal recording system having post-recording heating means according to another embodiment of the present invention.

FIG. 41 shows a thermal recording system according to a twentyfourth embodiment of the present invention, in which a light detector 228 is provided for detecting the density of color developed in the thermo-sensitive recording medium Sb by detecting the intensity of light emitted from an LED 226 and passed through the thermo-sensitive recording medium Sb. The light detector 228 is disposed on an edge of the thermo-sensitive recording medium Sb between the scanning position of a laser beam L and heating rollers 212a, 212b which constitute a post-recording heating unit 206. The LED 226 is disposed at a position corresponding to the light detector 228 on the opposite surface of the thermo-sensitive recording medium Sb. The laser beam L emitted by the scanning optical system 202 shown in FIG. 39 has edge portions at the beginning and the end of the main scanning path in which the laser beam is not modified by the image signal and has a constant intensity. The edge portions of the laser beam L is irradiated to the corresponding edges of the thermo-sensitive recording medium Sb, and develop color of a constant density in the edges. The density of color thus developed in one of edges of the thermo-sensitive recording medium Sb is detected by the light detector 228, and the detected signal is given to a controller 230 for controlling the temperature to be attained by the post-recording heating unit 206.

Figure 42:
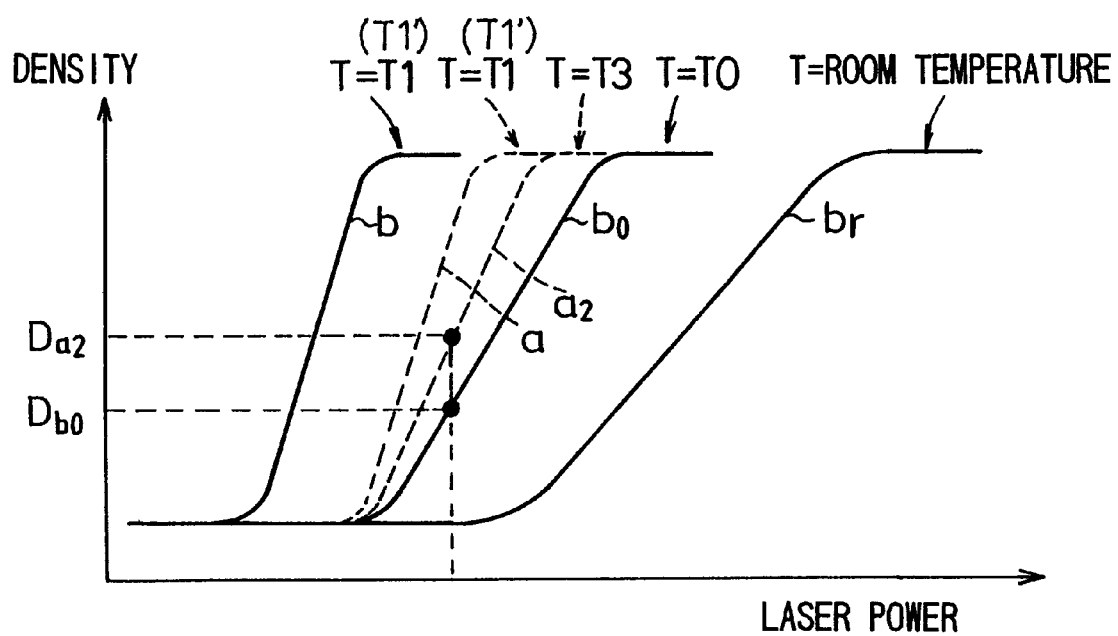
FIG. 42 is a view for describing a color development characteristic of the thermo-sensitive recording medium.

FIG. 42 shows color-developing characteristics of the thermo-sensitive recording medium Sb. As the temperature in the preheating or the post-recording heating is higher, the higher is the density of color developed in the thermosensitive recording medium Sb at a constant laser intensity. For the thermo-sensitive recording medium Sb which has been held at the room temperature and directly subjected to the laser beam L, color is developed according to a curve $b_r$. When the thermo-sensitive recording medium Sb is preheated to a temperature T0 higher than the room temperature, color is developed according to a curve $b_0$ upon application of the laser beam L. Further, when the thermo-sensitive recording medium Sb is preheated to a temperature T1 higher than the temperature T0 and immediately before the color-developing temperature, color is developed according to a curve b upon application of the laser beam L. For the thermo-sensitive recording medium Sb which has been preheated to T0 and developed color according to the curve $b_0$ by laser beam L, the density of color is increased according to a curve $a_2$ upon subjected to the post-recording heating at a temperature T3 (T3>T0). Further, for the thermo-sensitive recording medium Sb which has been preheated to T0 and developed color according to the curve $b_0$ by laser beam L, the density of color is increased according to a curve a upon subjected to the post-recording heating at a temperature T1' (T1'>T3) which is immediately before the color-developing temperature.

With the arrangement shown in FIG. 41, a desired density of color is attained as follows. Assume that the density of color in the edge of the thermo-sensitive recording medium Sb has been $Db_0$ according to the curve $b_0$ (at a preheating temperature T0), and a desired density is $Da_2$. Then, the controller 230 controls the post-recording heater 206 to attain the temperature of T3 at which the curve $a_2$ is applicable. Consequently, the desired density $Da_2$ is obtained. As described above, in addition to the control of the temperature in the post-recording heating, the temperature in the preheating or the intensity of the laser beam L may be controlled.

Twentyfifth Embodiment

Figure 43:
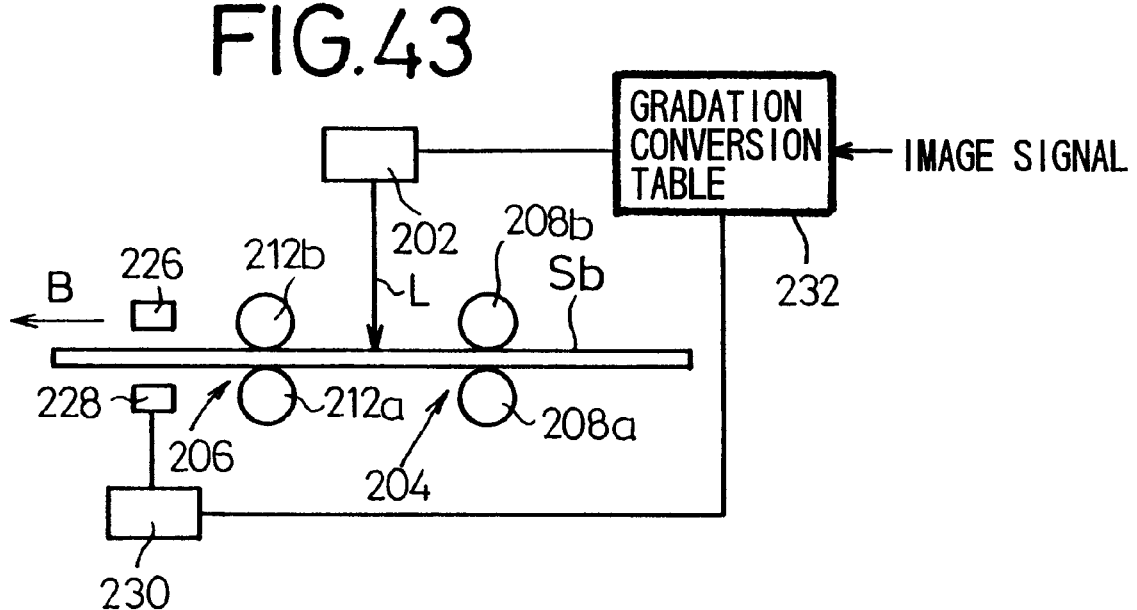
FIG. 43 is a schematic view illustrating the structure of a thermal recording system having post-recording heating means according to still another embodiment of the present invention.

FIG. 43 shows a thermal recording system according to a twentyfifth embodiment of the present invention, which is adapted for carrying out a calibration run based on a set of standard gradation data prior to recording an image. The thermal recording system of this embodiment comprises a gradation conversion table 232 for converting an image signal to an input signal to the driver 218 shown in FIG. 39, and the LED 226 and the light detector 228 shown in FIG. 41 which are moved downstream in the auxiliary scanning direction beyond the post-recording heater 206. The gradation conversion table 232 receives an adjusting signal from the controller 230 for altering conversion table parameters.

In the calibration run, the preheater 204 and the post-recording heater 206 are set at temperatures T1, T1' which are immediately before the color-developing temperature of the thermo-sensitive recording medium Sb, and the standard gradation data including a plurality of density steps are inputted to the gradation conversion table 232 in place of the image signal. The laser beam L whose intensity is modified according to the standard gradation data is irradiated to the thermo-sensitive recording medium Sb to form a test pattern thereon, which includes the density steps corresponding to the standard gradation data. The density of the test pattern is detected by the light detector 228 associated with the LED 226, and the detected signal is inputted to the controller 230. The controller 230 compares the detected signal with the standard gradation data and outputs the adjusting signal to the gradation conversion table 232, thereby to adjust the conversion table parameters.

Thereafter, a desired image is recorded on the thermo-sensitive recording medium Sb with the gradation conversion table whose conversion table parameters have been adjusted in the calibration run.

The thermal recording system according to the present invention can bring about the following advantageous effects.

That is, leuco dyes, a developer and light-absorbing dyes are provided on a support. Further, a thermo-sensitive recording medium, which develops color in continuous tone at a density corresponding to the thermal energy applied thereto, is preheated up to a thermal energy level immediately before the color development. Therefore, a heating-beam generating means controls a laser beam in a sufficient control range so that an image or the like can be recorded. Accordingly, a high-tonal image can be formed with high accuracy. It is therefore unnecessary for the heating-beam generating means to produce an high output in particular. As a result, the thermal recording system can be simplified in overall structure and reduced in cost.

Still further, the thermo-sensitive recording medium, which develops color in continuous tone at a density corresponding to the thermal applied thereto, is heated after an image is recorded by the laser beam. This post-recording heating accelerates the coloring reaction of the thermo-sensitive materials including in the thermo-sensitive recording medium, and stabilizes the density of color in the recorded image.

Having now fully described the invention, it will be apparent to those skilled in the art that many changes and modifications can be made without departing from the spirit or scope of the invention as set forth herein.

What is claimed is:

1. A thermal recording system comprising:
   (i) a thermo-sensitive recording medium formed with a heat-sensitive layer containing leuco dyes, a developer and light-absorbing dyes all provided on a support, wherein said heat-sensitive layer is capable of forming an image having a tone gradation corresponding to thermal energy supplied based on image data;
   (ii) preheating means for preheating said heat-sensitive layer in a non-contacting manner with a thermal energy less than a predetermined color-developing thermal energy; and
   (iii) heating-beam generating means for scanning said thermo-sensitive recording medium from a side on which said heat-sensitive layer is disposed with a laser beam, wherein by applying a predetermined light energy to said heat-sensitive layer and thereby generating heat inside said heat-sensitive layer, a predetermined color-developing thermal energy is applied to said heat-sensitive layer, said heating-beam generating means recording an image in continuous tone.

2. A thermal recording system according to claim 1, wherein said predetermined temperature is between 40° C. and 275° C.

3. A thermal recording system according to claim 1, wherein said preheating means preheats for 30 seconds or less.

4. A thermal recording system according to claim 1, wherein said preheating means comprises a conductive heat-generating layer formed in said thermo-sensitive recording medium and a current supply circuit for supplying current to said conductive heat-generating layer so as to bring said conductive heat-generating layer to said predetermined temperature.

5. A thermal recording system according to claim 4, wherein said current supply circuit supplies current to said conductive heat-generating layer through two electrodes held in contact with two points thereof spaced away from each other along a scanning direction of the laser beam.

6. A thermal recording system according to claim 4, wherein said thermo-sensitive recording medium comprises a plurality of first and second parallel electrode lines arranged along main and auxiliary scanning directions respectively, said first and second parallel electrode lines being disposed in an opposing relationship with said conductive heat-generating layer interposed therebetween, and said current supply circuit comprises first electrode selecting means for selecting a desired electrode line from said plurality of first parallel electrode lines, and second electrode selecting means for selecting a desired electrode line from said plurality of second parallel electrode lines, and current supplying means for supplying current to said first and second electrode selecting means.

7. A thermal recording system according to claim 1, wherein said preheating means has heat generating means for heating at least a portion of said thermo-sensitive recording medium, said portion being located near a position where said thermo-sensitive recording medium is scanned with the laser beam, in a state in which said portion is in contact with said heat generating means.

8. A thermal recording system according to claim 7, wherein said heat generating means comprises a heat roller having a shaft parallel to a scanning direction of the laser beam.

9. A thermal recording system according to claim 7, wherein said heat generating means comprises a heating material accommodated in a molten state within a casing held in contact with said thermo-sensitive recording medium, and a temperature controller for maintaining said heating material at a molten-status temperature at which said heating material changes from a solid to a liquid.

10. A thermal recording system according to claim 7, wherein said heat generating means comprises a heating material accommodated in a vaporized state within a casing which is held in contact with said thermo-sensitive recording medium, and a temperature controller for keeping said heating material at a vaporization-status temperature at which said heating material changes from a liquid to a gas.

11. A thermal recording system according to claim 1, wherein said preheating means has heat generating means for heating an entire surface of said thermo-sensitive recording medium in a state in which said entire surface is not in contact with said heat generating means.

12. A thermal recording system according to claim 1, wherein said preheating means includes heat generating means for heating at least a portion of said thermo-sensitive recording medium, said portion being located near a position where said thermo-sensitive recording medium is scanned with the laser beam, in a state in which said portion is not in contact with said heat generating means.

13. A thermal recording system according to claim 12, wherein said heat generating means is a preheating heater for emitting infrared radiation.

14. A thermal recording system according to claim 13, wherein said preheating heater is surrounded by a thermal-insulated casing.

15. A thermal recording system according to claim 12, wherein said heating-beam generating means is provided with a surrounding casing, and said heat generating means comprises a heater attached to a portion of said casing.

16. A thermal recording system according to claim 12, wherein said heat generating means is a thermal plate for emitting infrared radiation.

17. A thermal recording system according to claim 12, wherein said heat generating means is a high-frequency induction coil.

18. A thermal recording system according to claim 12, wherein said heat generating means is a high-frequency induction electrode.

19. A thermal recording system according to claim 12, wherein said preheating means has a slit member disposed between said heat generating means and said thermo-sensitive recording medium, for restricting the irradiation region of heat emitted from said heat generating means to said thermo-sensitive recording medium, to the portion of said thermo-sensitive recording medium, which is located near said scanning position of the laser beam.

20. A thermal recording system according to claim 12, wherein said preheating means has a light source for emitting infrared radiation including wavelengths absorbed by infrared absorbing dyes contained in the said thermo-sensitive recording medium, and light condensing means for concentrating at least infrared radiation of said wavelengths on said thermo-sensitive recording medium.

21. A thermal recording system according to claim 20, wherein said light source and said light condensing means are a point light source and a cylindrical lens respectively, and light introducing means for introducing point-like infrared radiation emitted from said light source into said cylindrical lens as linear infrared radiation is disposed between said light source and said light condensing means.

22. A thermal recording system according to claim 1, wherein said preheating means includes a plurality of heat generating means for heating said thermo-sensitive recording medium wherein some of said heat generating means are in contact with said thermo-sensitive recording medium and some of said heat generating means are not in contact with said thermo-sensitive recording medium.

23. A thermal recording system according to claim 22, wherein said heat generating means comprises any one of a combination of contact heating portions respectively corresponding to the upstream and downstream sides of said thermo-sensitive recording medium, a combination of the contact heating portion corresponding to the upstream side thereof and a non-contact heating portion corresponding to the downstream side thereof, and a combination of a non-contact heating portion corresponding to the upstream side thereof and the contact heating portion corresponding to the downstream side thereof.

24. A thermal recording system according to claim 22, wherein said heat generating means is constructed so as to heat said thermo-sensitive recording medium by energy generated from an upstream-side heat generating portion of said thermo-sensitive recording medium, such energy being greater than that generated by a downstream-side heat generating portion thereof.

25. A thermal recording system according to claim 1, wherein said preheating means comprises preheating-beam generating means for irradiating a portion of said thermo-sensitive recording medium with another laser beam, said portion being located near the position where said thermo-sensitive recording medium is scanned with the laser beam emitted from said heating-beam generating means and for preheating said thermo-sensitive recording medium to a predetermined preheat temperature.

26. A thermal recording system according to claim 1, wherein said thermo-sensitive recording medium has a heat absorption layer for absorbing preheat produced by said preheating means.

27. A thermal recording system according to claim 1, wherein said preheating means comprises heat generating means for heating said thermo-sensitive recording medium, temperature detecting means for detecting a preheat temperature of said thermo- sensitive recording medium, and temperature controlling means for controlling said heat generating means so as to set the preheat temperature detected by said temperature detecting means to a predetermined temperature.

28. A thermal recording system according to claim 27, wherein said temperature detecting means comprises first temperature detecting means for detecting the temperature in said thermal recording system and second temperature detecting means for detecting the temperature of a recording portion of said thermo-sensitive recording medium.

29. A thermal recording system according to claim 1, wherein said preheating means comprises heat generating means for heating a thermo-sensitive recording means, a preheat-type color-developing portion formed in said thermo-sensitive recording medium and for developing color at a density corresponding to a preheat temperature applied by said heat generating means, a densitometer for detecting the density of said preheat-type color-developing portion, and temperature controlling means controlling said heat generating means so as to set the density detected by said densitometer to a predetermined density.

30. A thermal recording system according to claim 29, wherein said preheat-type color-developing portion is provided at a portion other than an image recording region of said thermo-sensitive recording medium.

31. A thermal recording system according to claim 29, wherein said preheat-type color-developing portion comprises a thermo-sensitive recording medium which develops color at a predetermined temperature or above and loses the color at the predetermined temperature or below.

32. A thermal recording system according to claim 1, further comprising:

(i) a slit member having an aperture, wherein said preheating means comprises heat generating means for heating said thermo-sensitive recording medium through said aperture;

(ii) a preheat-type color-developing portion formed in said thermo-sensitive recording medium and used to develop color at a density corresponding to a preheat temperature applied by said heat generating means;

(iii) density detecting means for detecting the density of said preheat-type color-developing portion, and;

(iv) controlling means for controlling the width of said aperture so as to set the density detected by said density detecting means to a predetermined density.

33. A thermal recording system according to claim 1, further comprising a rotatable drum wherein said thermo-sensitive recording medium is mounted on the outer peripheral surface of said drum, and said preheating means and said heating-beam generating means are moved relative to each other along the direction parallel to the rotating axis of said drum.

\* \* \* \* \*